United States Patent
Duluk, Jr. et al.

(10) Patent No.: US 10,216,413 B2
(45) Date of Patent: *Feb. 26, 2019

(54) MIGRATION OF PEER-MAPPED MEMORY PAGES

(71) Applicant: NVIDIA Corporation, Santa Clara, CA (US)

(72) Inventors: Jerome F. Duluk, Jr., Palo Alto, CA (US); John Mashey, Portola Valley, CA (US); Mark Hairgrove, San Jose, CA (US); Chenghuan Jia, Fremont, CA (US); Cameron Buschardt, Round Rock, TX (US); Lucien Dunning, Santa Clara, CA (US); Brian Fahs, Los Altos, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/583,920

(22) Filed: May 1, 2017

(65) Prior Publication Data

US 2017/0235491 A1 Aug. 17, 2017

Related U.S. Application Data

(63) Continuation of application No. 14/134,148, filed on Dec. 19, 2013, now Pat. No. 9,639,474.

(60) Provisional application No. 61/794,345, filed on Mar. 15, 2013, provisional application No. 61/800,004, filed on Mar. 15, 2013.

(51) Int. Cl.
*G06F 12/00* (2006.01)
*G06F 13/00* (2006.01)
*G06F 3/06* (2006.01)
*G06F 12/1009* (2016.01)
*G06F 12/0804* (2016.01)
(Continued)

(52) U.S. Cl.
CPC .......... *G06F 3/0604* (2013.01); *G06F 3/0647* (2013.01); *G06F 3/0664* (2013.01); *G06F 12/0804* (2013.01); *G06F 12/1009* (2013.01); *G06F 13/4022* (2013.01); *G06F 13/4282* (2013.01); *G06F 2212/657* (2013.01)

(58) Field of Classification Search
None
See application file for complete search history.

(56) References Cited

U.S. PATENT DOCUMENTS 5,394,551 A 9/1995 Holt
5,752,258 A 5/1998 Guzovskiy
(Continued)

*Primary Examiner* — Sean D Rossiter
(74) *Attorney, Agent, or Firm* — Artegis Law Group, LLP

(57) ABSTRACT

Techniques are provided by which memory pages may be migrated among PPU memories in a multi-PPU system. According to the techniques, a UVM driver determines that a particular memory page should change ownership state and/or be migrated between one PPU memory and another PPU memory. In response to this determination, the UVM driver initiates a peer transition sequence to cause the ownership state and/or location of the memory page to change. Various peer transition sequences involve modifying mappings for one or more PPU, and copying a memory page from one PPU memory to another PPU memory. Several steps in peer transition sequences may be performed in parallel for increased processing speed.

26 Claims, 10 Drawing Sheets

(51) Int. Cl.
*G06F 13/40* (2006.01)
*G06F 13/42* (2006.01)

(56) References Cited

U.S. PATENT DOCUMENTS

| | | |
|---|---|---|
| 5,829,041 A | 10/1998 | Okamoto |
| 7,774,645 B1 | 8/2010 | Clark |
| 2008/0104330 A1* | 5/2008 | Deshpande ......... G06F 12/0817 |
| | | 711/141 |
| 2009/0164737 A1* | 6/2009 | Deshpande ......... G06F 12/0828 |
| | | 711/141 |
| 2015/0082001 A1 | 3/2015 | Duncan |
| 2016/0342512 A1 | 11/2016 | Sakashita |

* cited by examiner

MIGRATION OF PEER-MAPPED MEMORY PAGES

CROSS-REFERENCE TO RELATED APPLICATIONS

This application is a continuation of U.S. patent application titled, "MIGRATION OF PEER-MAPPED MEMORY PAGES," filed Dec. 19, 2013 and having Ser. No. 14/134,148, which claims the priority benefit of the U. S. Provisional patent application titled "MULTIPLE GPUS WITH MULTIPLE SEMI-SYNCHRONIZED PAGE TABLES AND MIGRATION," filed Mar. 15, 2013 and having Ser. No. 61/794,345, and also claims the priority benefit of the U.S. Provisional patent application titled "CPU-TO-GPU AND GPU-TO-GPU ATOMICS," filed Mar. 15, 2013 and having Ser. No. 61/800,004. The subject matter of these related applications is hereby incorporated herein by reference.

BACKGROUND OF THE INVENTION

Field of the Invention

The present invention generally relates to computer science and, more specifically, to migration of peer-mapped memory pages.

Description of the Related Art

A typical computer system usually includes a central processing unit (CPU) and some sort of parallel processing unit (PPU). Some PPUs are capable of very high performance using a relatively large number of small, parallel execution threads on dedicated programmable hardware processing units. The specialized design of such PPUs usually allows these PPUs to perform certain tasks, such as rendering 3-D scenes, much faster than a CPU. However, the specialized design of these PPUs also limits the types of tasks that the PPU can perform. By contrast, the CPU is typically a more general-purpose processing unit and therefore can perform most tasks. Consequently, the CPU usually executes the overall structure of a software application and then configures the PPU to implement tasks that are amenable to parallel processing.

As software applications execute on the computer system, the CPU and the PPU perform memory operations to store and retrieve data in physical memory locations. Some advanced computer systems implement a unified virtual memory architecture (UVM) common to both the CPU and the PPU. Among other things, the architecture enables the CPU and the PPU to access a physical memory location using a common (e.g., the same) virtual memory address, regardless of whether the physical memory location is within system memory or memory local to the PPU (PPU memory).

Further, some computer architectures include multiple PPUs, for increased processing performance. In such architectures, each PPU may be associated with a local memory that stores memory pages, and with a local page table that keeps track of the memory pages stored in the associated local memory.

One drawback to including multiple PPUs in a computer architecture that implements unified virtual memory, where each PPU has a local memory and local page table is that migrating the different memory pages among the different PPU local memories becomes more complicated. For example, one difficulty that may arise is determining how to update the page table entries associated with the different memory pages when migrating memory pages among the different local PPU memories.

As the foregoing illustrates, what is needed in the art is a more effective approach to migrating memory pages in unified virtual memory architecture that implements multiple PPUs.

SUMMARY OF THE INVENTION

One embodiment of the present invention sets forth a computer-implemented method for modifying memory page ownership in a virtual memory subsystem having two or more parallel processing units. The method includes determining a current ownership state for a memory page that indicates which PPU in the virtual memory subsystem is associated with a PPU memory in which the memory page is currently stored and which PPUs in the virtual memory subsystem have page tables that include a page table entry corresponding to the memory page. The method also includes determining a new ownership state for the memory page that indicates which PPU in the virtual memory subsystem is associated with a PPU memory in which the memory page should be stored and which PPUs in the virtual memory subsystem should have page tables that include a page table entry corresponding to the memory page. The method further includes modifying a page table entry included in a page table associated with at least one PPU in the virtual memory subsystem, based on the current ownership state and the new ownership state.

One advantage of the disclosed approach is that techniques are provided that allow memory pages to be migrated among PPU memories in a multi-PPU system. Migrating memory pages among PPU memories improves access speed by moving memory pages closer to PPUs that frequently access the memory pages. Another advantage is that the techniques for migrating memory pages among PPU memories in the multi-PPU system may be performed in parallel, which increases the speed with which these techniques can be performed.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
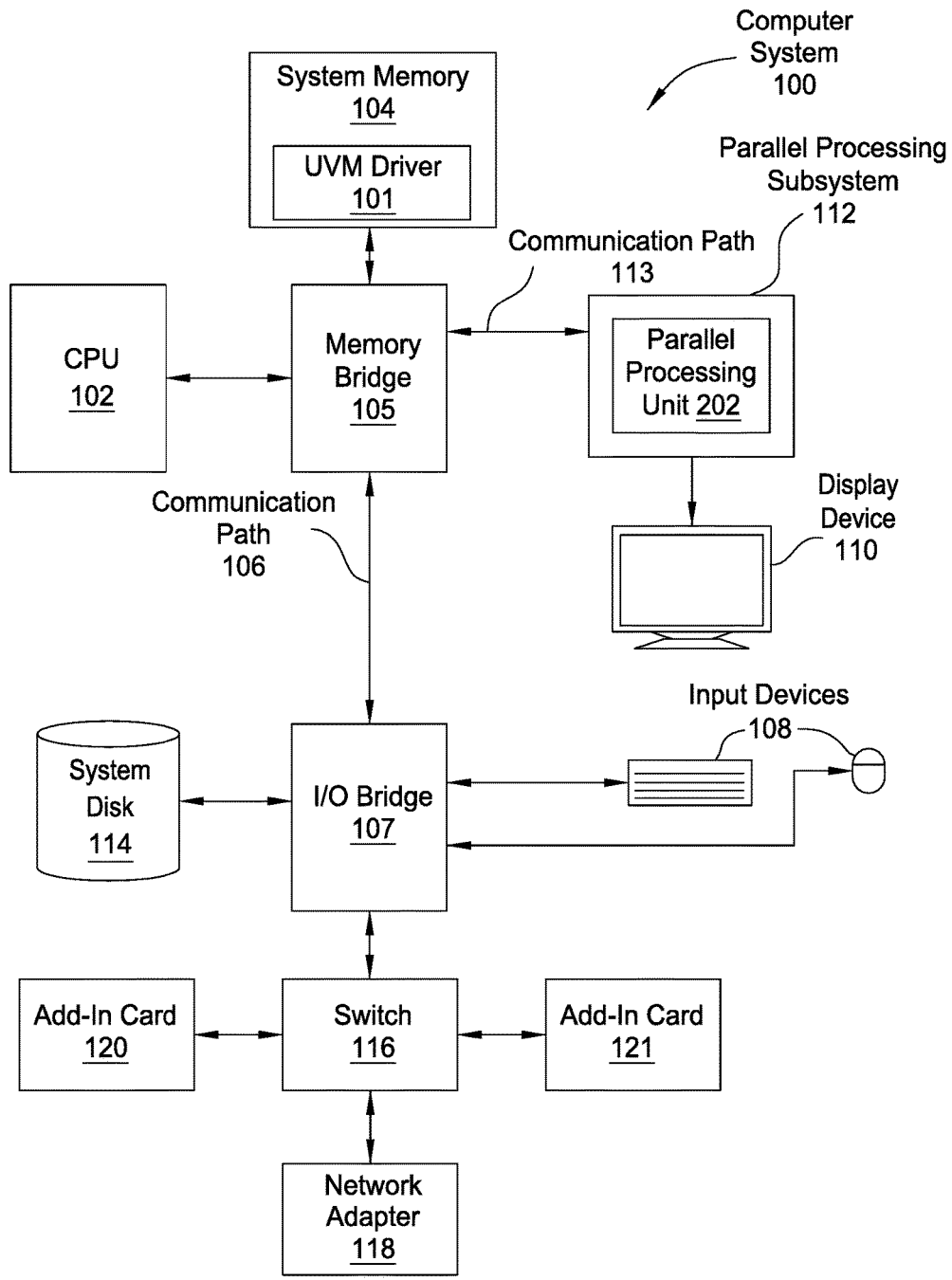
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides nonvolatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes one or more parallel processing units (PPUs) 202. In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC). As is well-known, many graphics processing units (GPUs) are designed to perform parallel operations and computations and, thus, are considered to be a class of parallel processing unit (PPU).

Any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

PPU 202 advantageously implements a highly parallel processing architecture. PPU 202 includes a number of general processing clusters (GPCs). Each GPC is capable of executing a large number (e.g., hundreds or thousands) of threads concurrently, where each thread is an instance of a program. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads. Unlike a SIMD execution regime, where all processing engines typically execute identical instructions, SIMT execution allows different threads to more readily follow divergent execution paths through a given thread program.

GPCs include a number of streaming multiprocessors (SMs), where each SM is configured to process one or more thread sets. The series of instructions transmitted to a particular GPC constitutes a thread, as previously defined herein, and the collection of a certain number of concurrently executing threads across the parallel processing engines within an SM is referred to herein as a "set of threads," a "warp," or a "thread group." As used herein, a "thread group" refers to a group of threads concurrently executing the same program on different input data, with one thread of the group being assigned to a different processing engine within an SM. Additionally, a plurality of related thread groups may be active (in different phases of execution) at the same time within an SM. This collection of thread groups is referred to herein as a "cooperative thread array" ("CTA") or "thread array."

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

In operation, CPU 102 is the master processor of computer system 100, controlling and coordinating operations of other system components. In particular, CPU 102 issues commands that control the operation of PPUs 202. In one embodiment, communication path 113 is a PCI Express link, in which dedicated lanes are allocated to each PPU 202, as is known in the art. Other communication paths may also be used. PPU 202 advantageously implements a highly parallel processing architecture. A PPU 202 may be provided with any amount of local parallel processing memory (PPU memory).

In some embodiments, system memory 104 includes a unified virtual memory (UVM) driver 101. The UVM driver 101 includes instructions for performing various tasks related to management of a unified virtual memory (UVM) system common to both the CPU 102 and the PPUs 202. Among other things, the architecture enables the CPU 102 and the PPU 202 to access a physical memory location using a common virtual memory address, regardless of whether the physical memory location is within the system memory 104 or memory local to the PPU 202.

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Unified Virtual Memory System Architecture

Figure 2:
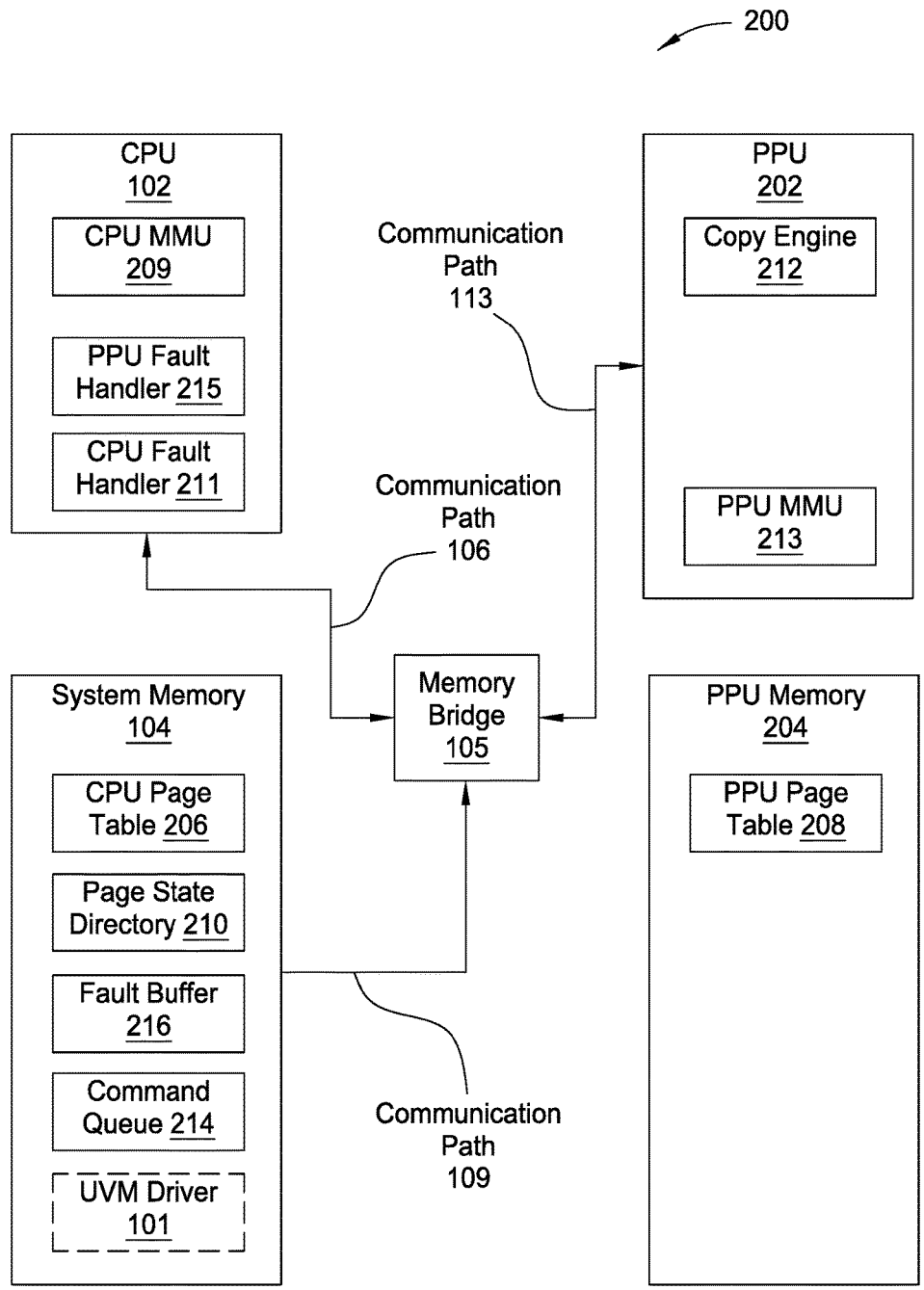
FIG. 2 is a block diagram illustrating a unified virtual memory system (UVM), according to one embodiment of the present invention.

FIG. 2 is a block diagram illustrating a unified virtual memory (UVM) system 200, according to one embodiment of the present invention. As shown, the unified virtual memory system 200 includes, without limitation, the CPU 102, the system memory 104, and the parallel processing unit (PPU) 202 coupled to a parallel processing unit memory (PPU memory) 204. The CPU 102 and the system memory 104 are coupled to each other and to the PPU 202 via the memory bridge 105.

The CPU 102 executes threads that may request data stored in the system memory 104 or the PPU memory 204 via a virtual memory address. Virtual memory addresses shield threads executing in the CPU 102 from knowledge about the internal workings of a memory system. Thus, a thread may only have knowledge of virtual memory addresses, and may access data by requesting data via a virtual memory address.

The CPU 102 includes a CPU MMU 209, which processes requests from the CPU 102 for translating virtual memory addresses to physical memory addresses. The physical memory addresses are required to access data stored in a physical memory unit such as the system memory 104 and the PPU memory 204. The CPU 102 includes a CPU fault handler 211, which executes steps in response to the CPU MMU 209 generating a page fault, to make requested data available to the CPU 102. The CPU fault handler 211 is generally software that resides in the system memory 104 and executes on the CPU 102, the software being provoked by an interrupt to the CPU 102.

The system memory 104 stores various memory pages (not shown) that include data for use by threads executing on the CPU 102 or the PPU 202. As shown, the system memory 104 stores a CPU page table 206, which includes mappings between virtual memory addresses and physical memory addresses. The system memory 104 also stores a page state directory 210, which acts as a "master page table" for the UVM system 200, as is discussed in greater detail below. The system memory 104 stores a fault buffer 216, which includes entries written by the PPU 202 in order to inform the CPU 102 of a page fault generated by the PPU 202. In some embodiments, the system memory 104 includes the unified virtual memory (UVM) driver 101, which includes instructions that, when executed, cause the CPU 102 to execute commands for, among other things, remedying a page fault. In alternative embodiments, any combination of the page state directory 210, the fault buffer 216, and one or more command queues 214 may be stored in the PPU memory 204. Further, a PPU page table 208 may be stored in the system memory 104.

In a similar manner as with the CPU 102, the PPU 202 executes instructions that may request data stored in the system memory 104 or the PPU memory 204 via a virtual memory address. The PPU 202 includes a PPU MMU 213, which processes requests from the PPU 202 for translating virtual memory addresses to physical memory addresses. The PPU 202 also includes a copy engine 212, which executes commands stored in the command queue 214 for copying memory pages, modifying data in the PPU page table 208, and other commands. A PPU fault handler 215 executes steps in response to a page fault on the PPU 202. The PPU fault handler 215 can be software running on a processor or dedicated microcontroller in the PPU 202. Alternatively, the PPU fault handler 215 can be combination of software running on the CPU 102 and software running on the dedicated microcontroller in the PPU 202, communicating with each other. In some embodiments, the CPU fault handler 211 and the PPU fault handler 215 can be a unified software program that is invoked by a fault on either the CPU 102 or the PPU 202. The command queue 214 may be in either the PPU memory 204 or the system memory 104, but is preferentially located in the system memory 104.

In some embodiments, the CPU fault handler 211 and the UVM driver 101 may be a unified software program. In such cases, the unified software program may be software that resides in the system memory 104 and executes on the CPU 102. The PPU fault handler 215 may be a separate software program running on a processor or dedicated microcontroller in the PPU 202, or the PPU fault handler 215 may be a separate software program running on the CPU 102.

In other embodiments, the PPU fault handler 215 and the UVM driver 101 may be a unified software program. In such cases, the unified software program may be software that resides in the system memory 104 and executes on the CPU 102. The CPU fault handler 211 may be a separate software program that resides in the system memory 104 and executes on the CPU 102.

In other embodiments, the CPU fault handler 211, the PPU fault handler 215, and the UVM driver 101 may be a unified software program. In such cases, the unified software program may be software that resides in the system memory 104 and executes on the CPU 102.

In some embodiments, the CPU fault handler 211, the PPU fault handler 215, and the UVM driver 101 may all reside in system memory 104, as described above. As shown in FIG. 2, the UVM driver 101 resides in system memory 104, while the CPU fault handler 211 and the PPU fault handler 215 reside in the CPU 102.

The CPU fault handler 211 and the PPU fault handler 215 are responsive to hardware interrupts that may emanate from the CPU 102 or the PPU 202, such as interrupts resulting from a page fault. As further described below, the UVM driver 101 includes instructions for performing various tasks related to management of the UVM system 200, including, without limitation, remedying a page fault, and accessing the CPU page table 206, the page state directory 210, and/or the fault buffer 216.

In some embodiments, the CPU page table 206 and the PPU page table 208 have different formats, and contain different information; for example, the PPU page table 208 may contain the following while the CPU page table 206 does not: atomic disable bit; compression tags; and memory swizzling type.

In a similar manner as with the system memory 104, the PPU memory 204 stores various memory pages (not shown). As shown, the PPU memory 204 also includes the PPU page table 208, which includes mappings between virtual memory addresses and physical memory addresses. Alternatively, the PPU page table 208 may be stored in the system memory 104.

Translating Virtual Memory Addresses

When a thread executing in the CPU 102 requests data via a virtual memory address, the CPU 102 requests translation of the virtual memory address to a physical memory address, from the CPU memory management unit (CPU MMU) 209. In response, the CPU MMU 209 attempts to translate the virtual memory address into a physical memory address, which specifies a location in a memory unit, such as the system memory 104, that stores the data requested by the CPU 102.

To translate a virtual memory address to a physical memory address, the CPU MMU 209 performs a lookup operation to determine if the CPU page table 206 includes a mapping associated with the virtual memory address. In addition to a virtual memory address, a request to access data may also indicate a virtual memory address space. The unified virtual memory system 200 may implement multiple virtual memory address spaces, each of which is assigned to one or more threads. Virtual memory addresses are unique within any given virtual memory address space. Further, virtual memory addresses within a given virtual memory address space are consistent across the CPU 102 and the PPU 202, thereby allowing the same virtual address to refer to the same data across the CPU 102 and the PPU 202. In some embodiments, two virtual memory addresses may refer to the same data, but may not map to the same physical memory address (e.g., the CPU 102 and the PPU 202 may each have a local read-only copy of the data.)

For any given virtual memory address, the CPU page table 206 may or may not include a mapping between the virtual memory address and a physical memory address. If the CPU page table 206 includes a mapping, then the CPU MMU 209 reads that mapping to determine a physical memory address associated with the virtual memory address and provides that physical memory address to the CPU 102. However, if the CPU page table 206 does not include a mapping associated with the virtual memory address, then the CPU MMU 209 is unable to translate the virtual memory address into a physical memory address, and the CPU MMU 209 generates a page fault. To remedy a page fault and make the requested data available to the CPU 102, a "page fault sequence" is executed. More specifically, the CPU 102 reads the PSD 210 to find the current mapping state of the page and then determines the appropriate page fault sequence. The page fault sequence generally maps the memory page associated with the requested virtual memory address or changes the types of accesses permitted (e.g., read access, write access, atomic access). The different types of page fault sequences implemented in the UVM system 200 are discussed in greater detail below.

Within the UVM system 200, data associated with a given virtual memory address may be stored in the system memory 104, in the PPU memory 204, or in both the system memory 104 and the PPU memory 204 as read-only copies of the same data. Further, for any such data, either or both of the CPU page table 206 or the PPU page table 208 may include a mapping associated with that data. Notably, some data exists for which a mapping exists in one page table, but not in the other. However, the PSD 210 includes all mappings stored in the PPU page table 208, and the PPU-relevant mappings stored in the CPU page table 206. The PSD 210 thus functions as a "master" page table for the unified virtual memory system 200. Therefore, when the CPU MMU 209 does not find a mapping in the CPU page table 206 associated with a particular virtual memory address, the CPU 102 reads the PSD 210 to determine whether the PSD 210 includes a mapping associated with that virtual memory address. Various embodiments of the PSD 210 may include different types of information associated with virtual memory addresses in addition to mappings associated with the virtual memory address.

When the CPU MMU 209 generates a page fault, the CPU fault handler 211 executes a sequence of operations for the appropriate page fault sequence to remedy the page fault. Again, during a page fault sequence, the CPU 102 reads the PSD 210 and executes additional operations in order to change the mappings or permissions within the CPU page table 206 and the PPU page table 208. Such operations may include reading and/or modifying the CPU page table 206, reading and/or modifying page state directory 210 entries, and/or migrating blocks of data referred to as "memory pages" between memory units (e.g., the system memory 104 and the PPU memory 204).

To determine which operations to execute in a page fault sequence, the CPU 102 identifies the memory page associated with the virtual memory address. The CPU 102 then reads state information for the memory page from the PSD 210 related to the virtual memory address associated with the memory access request that caused the page fault. Such state information may include, among other things, an ownership state for the memory page associated with the virtual memory address. For any given memory page, several ownership states are possible. For example, a memory page may be "CPU-owned," "PPU-owned," or "CPU-shared." A memory page is considered CPU-owned if the CPU 102 can access the memory page via a virtual address, and if the PPU 202 cannot access the memory page via a virtual address without causing a page fault. Preferably, a CPU-owned page resides in the system memory 104, but can reside in the PPU memory 204. A memory page is considered PPU-owned if the PPU 202 can access the page via a virtual address, and if the CPU 102 cannot access the memory page via a virtual address without causing a page fault. Preferably, a PPU-owned page resides in the PPU memory 204, but can reside in the system memory 104 when migration from the system memory 104 to the PPU memory 204 is not done, generally due to the short-term nature of the PPU ownership. Finally, a memory page is considered CPU-shared if the memory page is stored in the system memory 104 and a mapping to the memory page exists in the PPU page table 208 that allows the PPU 202 to access the memory page in the system memory 104 via a virtual memory address.

The UVM system 200 may assign ownership states to memory pages based on a variety of factors, including the usage history of the memory page. Usage history may include information regarding whether the CPU 102 or the PPU 202 accessed the memory page recently, and how many times such accesses were made. For example, the UVM system 200 may assign an ownership state of "CPU-owned" for a given memory page and locate the page in system memory 104 if, based on the usage history of the memory page, the UVM system 200 determines that the memory page is likely to be used mostly or only by the CPU 102. Similarly, the UVM system 200 may assign an ownership of "PPU-owned" for a given memory page and locate the page in PPU memory 204 if, based on the usage history of the memory page, the UVM system 200 determines that the memory page is likely to be used mostly or only by the PPU 202. Finally, the UVM system 200 may assign an ownership of "CPU-shared" for a given memory page if, based on the usage history of the memory page, the UVM system 200 determines that the memory page is likely to be used both by the CPU 102 and by the PPU 202, and that migrating the memory page back and forth from the system memory 104 to the PPU memory 204 would consume too much time.

As examples, the fault handlers 211 and 215 can implement any or all of the following heuristics for migrating:

(a) on the CPU 102 access to an unmapped page that is mapped to the PPU 202, that has not been recently migrated, unmap the faulting page from the PPU 202, migrate the page to the CPU 102, and map the page to the CPU 102;

(b) on the PPU 202 access to an unmapped page that is mapped to the CPU 102, that has not been recently migrated, unmap the faulting page from the CPU 102, migrate the page to the PPU 202, and map the page to the PPU 202;

(c) on the CPU 102 access to an unmapped page that is mapped to the PPU 202, that has been recently migrated, migrate the faulting page to the CPU 102 and map the page on both the CPU 102 and the PPU 202;

(d) on the PPU 102 access to an unmapped page that is mapped on the CPU 102, that has been recently migrated, map the page to the PPU 202 and keep the mapping of the page on the CPU 102;

(e) on the PPU 102 atomic access to a page that is mapped to both the CPU 102 and the PPU 202 but not enabled for atomic operations by the PPU 202, unmap the page from the CPU 102, and map the page to the PPU 202 with atomic operations enabled;

(f) on the PPU 102 write access to a page that is mapped on the CPU 102 and PPU 202 as copy-on-write (COW), copy the page to the PPU 202, thereby making independent copies of the page, map the new page as read-write on the PPU, and leave the current page as mapped on the CPU 102;

(g) on the PPU 102 read access to page that is mapped on the CPU 102 and PPU 202 as zero-fill-on-demand (ZFOD), allocate a page of physical memory on the PPU 202 and fill it with zeros, and map that page on the PPU, but change it to unmapped on the CPU 102;

(h) on an access by a first PPU 202(1) to an unmapped page that is mapped on a second PPU 202(2), that has not been recently migrated, unmap the faulting page from the second PPU 202(2), migrate the page to the first PPU 202(1), and map the page to the first PPU 202(1); and (i) on an access by a first PPU 202(1) to an unmapped page that is mapped on a second PPU 202(2), that has been recently migrated, map the faulting page to the first PPU 202(1), and keep the mapping of the page on the second PPU 202(2).

In sum, many heuristic rules are possible, and the scope of the present invention is not limited to these examples.

In addition, any migration heuristic can "round up" to include more pages or a larger page size, for example:

(j) on the CPU 102 access to an unmapped page that is mapped to the PPU 202, that has not been recently migrated, unmap the faulting page, plus additional pages that are adjacent to the faulting page in the virtual address space, from the PPU 202, migrate the pages to the CPU 102, and map the pages to the CPU 102 (in more detailed example: for a 4 kB faulted page, migrate the aligned 64 kB region that includes the 4 kB faulted page);

(k) on the PPU 202 access to an unmapped page that is mapped to the CPU 102, that has not been recently migrated, unmap the faulting page, plus additional pages that are adjacent to the faulting page in the virtual address space, from the CPU 102, migrate the pages to the PPU 202, and map the pages to the PPU 202 (in more detailed example: for a 4 kB faulted page, migrate the aligned 64 kB region that includes the 4 kB faulted page);

(l) on the CPU 102 access to an unmapped page that is mapped to the PPU 202, that has not been recently migrated, unmap the faulting page, plus additional pages that are adjacent to the faulting page in the virtual address space, from the PPU 202, migrate the pages to the CPU 102, map the pages to the CPU 102, and treat all the migrated pages as one or more larger pages on the CPU 102 (in more detailed example: for a 4 kB faulted page, migrate the aligned 64 kB region that includes the 4 kB faulted page, and treat the aligned 64 kB region as a 64 kB page);

(m) on the PPU 202 access to an unmapped page that is mapped on the CPU 102, that has not been recently migrated, unmap the faulting page, plus additional pages that are adjacent to the faulting page in the virtual address space, from the CPU 102, migrate the pages to the PPU 202, map the pages to the PPU 202, and treat all the migrated pages as one or more larger pages on the PPU 202 (in more detailed example: for a 4 kB faulted page, migrate the aligned 64 kB region that includes the 4 kB faulted page, and treat the aligned 64 kB region as a 64 kB page);

(n) on the access by a first PPU 202(1) to an unmapped page that is mapped to a second PPU 202(2), that has not been recently migrated, unmap the faulting page, plus additional pages that are adjacent to the faulting page in the virtual address space, from the second PPU 202(2), migrate the pages to the first PPU 202(1), and map the pages to the first PPU 202(1); and (o) on an access by a first PPU 202(1) to an unmapped page that is mapped to a second PPU 202(2), that has been recently migrated, map the faulting page, plus additional pages that are adjacent to the faulting page in the virtual address space, to the first PPU 202(1), and keep the mapping of the page on the second PPU 202(2).

In sum, many heuristic rules that include "rounding up" are possible, and scope of the present invention is not limited to these examples.

In some embodiments, the PSD entries may include transitional state information to ensure proper synchronization between various requests made by units within the CPU 102 and the PPU 202. For example, a PSD 210 entry may include a transitional state indicating that a particular page is in the process of being transitioned from CPU-owned to PPU-owned. Various units in the CPU 102 and the PPU 202, such as the CPU fault handler 211 and the PPU fault handler 215, upon determining that a page is in such a transitional state, may forego portions of a page fault sequence to avoid steps in a page fault sequence triggered by a prior virtual memory access to the same virtual memory address. As a specific example, if a page fault results in a page being migrated from the system memory 104 to the PPU memory 204, a different page fault that would cause the same migration is detected and does not cause another page migration. Further, various units in the CPU 102 and the PPU 202 may implement atomic operations for proper ordering of operations on the PSD 210. For example, for modifications to PSD 210 entries, the CPU fault handler 211 or the PPU fault handler 215 may issue an atomic compare and swap operation to modify the page state of a particular entry in the PSD 210. Consequently, the modification is done without interference by operations from other units.

Multiple PSDs 210 may be stored in the system memory 104—one for each virtual memory address space. A memory access request generated by either the CPU 102 or the PPU 202 may therefore include a virtual memory address and also identify the virtual memory address space associated with that virtual memory address.

Just as the CPU 102 may execute memory access requests that include virtual memory addresses (i.e., instructions that include requests to access data via a virtual memory address), the PPU 202 may also execute similar types of memory access requests. More specifically, the PPU 202 includes a plurality of execution units, such as GPCs and SMs, described above in conjunction with FIG. 1, that are configured to execute multiple threads and thread groups. In operation, those threads may request data from memory (e.g., the system memory 104 or the PPU memory 204) by specifying a virtual memory address. Just as with the CPU 102 and the CPU MMU 209, the PPU 202 includes the PPU memory management unit (MMU) 213. The PPU MMU 213 receives requests for translation of virtual memory addresses from the PPU 202, and attempts to provide a translation from the PPU page table 208 for the virtual memory addresses.

Similar to the CPU page table 206, the PPU page table 208 includes mappings between virtual memory addresses and physical memory addresses. As is also the case with the CPU page table 206, for any given virtual address, the PPU page table 208 may not include a page table entry that maps the virtual memory address to a physical memory address. As with the CPU MMU 209, when the PPU MMU 213 requests a translation for a virtual memory address from the PPU page table 208 and either no mapping exists in the PPU page table 208 or the type of access is not allowed by the PPU page table 208, the PPU MMU 213 generates a page fault. Subsequently, the PPU fault handler 215 triggers a page fault sequence. Again, the different types of page fault sequences implemented in the UVM system 200 are described in greater detail below.

During a page fault sequence, the CPU 102 or the PPU 202 may write commands into the command queue 214 for execution by the copy engine 212. Such an approach frees up the CPU 102 or the PPU 202 to execute other tasks while the copy engine 212 reads and executes the commands stored in the command queue 214, and allow all the commands for a fault sequence to be queued at one time, thereby avoiding the monitoring of progress of the fault sequence. Commands executed by the copy engine 212 may include, among other things, deleting, creating, or modifying page table entries in the PPU page table 208, reading or writing data from the system memory 104, and reading or writing data to the PPU memory 204.

The fault buffer 216 stores fault buffer entries that indicate information related to page faults generated by the PPU 202. Fault buffer entries may include, for example, the type of access that was attempted (e.g., read, write, or atomic), the virtual memory address for which an attempted access caused a page fault, the virtual address space, and an indication of a unit or thread that caused a page fault. In operation, when the PPU 202 causes a page fault, the PPU 202 may write a fault buffer entry into the fault buffer 216 to inform the PPU fault handler 215 about the faulting page and the type of access that caused the fault. The PPU fault handler 215 then performs actions to remedy the page fault. The fault buffer 216 can store multiple faults because the PPU 202 is executing a plurality of threads, where each thread can cause a one or more faults due the pipelined nature of the memory accesses of the PPU 202.

Page Fault Sequences

As stated above, in response to receiving a request for translation of a virtual memory address, the CPU MMU 209 generates a page fault if the CPU page table 206 does not include a mapping associated with the requested virtual memory address or does not permit the type of access being requested. Similarly, in response to receiving a request for translation of a virtual memory address, the PPU MMU 213 generates a page fault if the PPU page table 208 does not include a mapping associated with the requested virtual memory address or does not permit the type of access being requested. When the CPU MMU 209 or the PPU MMU 213 generates a page fault, the thread that requested the data at the virtual memory address stalls, and a "local fault handler"—the CPU fault handler 211 for the CPU 102 or the PPU fault handler 215 for the PPU 202—attempts to remedy the page fault by executing a "page fault sequence." As indicated above, a page fault sequence includes a series of operations that enable the faulting unit (i.e., the unit—either the CPU 102 or the PPU 202—that caused the page fault) to access the data associated with the virtual memory address. After the page fault sequence completes, the thread that requested the data via the virtual memory address resumes execution. In some embodiments, fault recovery is simplified by allowing the fault recovery logic to track faulting memory accesses as opposed to faulting instructions.

The operations executed during a page fault sequence depend on the change in ownership state or change in access permissions, if any, that the memory page associated with the page fault has to undergo. The transition from a current ownership state to a new ownership state, or a change in access permissions, may be part of the page fault sequence. In some instances, migrating the memory page associated with the page fault from the system memory 104 to the PPU memory 204 is also part of the page fault sequence. In other instances, migrating the memory page associated with the page fault from the PPU memory 204 to the system memory 104 is also part of the page fault sequence. Various heuristics, more fully described herein, may be used to configure UVM system 200 to change memory page ownership state or to migrate memory pages under various sets of operating conditions and patterns. Described in greater detail below are page fault sequences for the following four memory page ownership state transitions: CPU-owned to CPU-shared, CPU-owned to PPU-owned, PPU-owned to CPU-owned, and PPU-owned to CPU-shared.

A fault by the PPU 202 may initiate a transition from CPU-owned to CPU-shared. Prior to such a transition, a thread executing in the PPU 202 attempts to access data at a virtual memory address that is not mapped in the PPU page table 208. This access attempt causes a PPU-based page fault, which then causes a fault buffer entry to be written to the fault buffer 216. In response, the PPU fault handler 215 reads the PSD 210 entry corresponding to the virtual memory address and identifies the memory page associated with the virtual memory address. After reading the PSD 210, the PPU fault handler 215 determines that the current ownership state for the memory page associated with the virtual memory address is CPU-owned. Based on the current ownership state as well as other factors, such as usage characteristics for the memory page or the type of memory access, the PPU fault handler 215 determines that a new ownership state for the page should be CPU-shared.

To change the ownership state, the PPU fault handler 215 writes a new entry in the PPU page table 208 corresponding to the virtual memory address and associating the virtual memory address with the memory page identified via the PSD 210 entry. The PPU fault handler 215 also modifies the PSD 210 entry for that memory page to indicate that the ownership state is CPU-shared. In some embodiments, an entry in a translation look-aside buffer (TLBs) in the PPU 202 is invalidated to account for the case where the translation to an invalid page is cached. At this point, the page fault sequence is complete. The ownership state for the memory page is CPU-shared, meaning that the memory page is accessible to both the CPU 102 and the PPU 202. Both the CPU page table 206 and the PPU page table 208 include entries that associate the virtual memory address to the memory page.

A fault by the PPU 202 may initiate a transition from CPU-owned to PPU-owned. Prior to such a transition, an operation executing in the PPU 202 attempts to access memory at a virtual memory address that is not mapped in the PPU page table 208. This memory access attempt causes a PPU-based page fault, which then causes a fault buffer entry to be written to the fault buffer 216. In response, the PPU fault handler 215 reads the PSD 210 entry corresponding to the virtual memory address and identifies the memory page associated with the virtual memory address. After reading the PSD 210, the PPU fault handler 215 determines that the current ownership state for the memory page associated with the virtual memory address is CPU-owned. Based on the current ownership state, as well as other factors, such as usage characteristics for the page or the type of memory access, the PPU fault handler 215 determines that a new ownership state for the page is PPU-owned.

To change the ownership state, the CPU 102 removes the mapping in the CPU page table 206 associated with the virtual memory address that caused the page fault. The CPU 102 may flush caches before and/or after the mapping is removed. The CPU 102 also writes commands into the command queue 214 instructing the PPU 202 to copy the page from the system memory 104 into the PPU memory 204. The copy engine 212 in the PPU 202 reads the commands in the command queue 214 and copies the page from the system memory 104 to the PPU memory 204. The PPU 202 writes a page table entry into the PPU page table 208 corresponding to the virtual memory address and associating the virtual memory address with the newly-copied memory page in the PPU memory 204. The writing to the PPU page table 208 may be done via the copy engine 212. Alternatively, the CPU 102 can update the PPU page table 208. The PPU fault handler 215 also modifies the PSD 210 entry for that memory page to indicate that the ownership state is PPU-owned. In some embodiments, entries in TLBs in the PPU 202 or the CPU 102 may be invalidated, to account for the case where the translation was cached. At this point, the page fault sequence is complete. The ownership state for the memory page is PPU-owned, meaning that the memory page is accessible only to the PPU 202. Only the PPU page table 208 includes an entry that associates the virtual memory address with the memory page.

A fault by the CPU 102 may initiate a transition from PPU-owned to CPU-owned. Prior to such a transition, an operation executing in the CPU 102 attempts to access memory at a virtual memory address that is not mapped in the CPU page table 206, which causes a CPU-based page fault. The CPU fault handler 211 reads the PSD 210 entry corresponding to the virtual memory address and identifies the memory page associated with the virtual memory address. After reading the PSD 210, the CPU fault handler 211 determines that the current ownership state for the memory page associated with the virtual memory address is PPU-owned. Based on the current ownership state, as well as other factors, such as usage characteristics for the page or the type of access, the CPU fault handler 211 determines that a new ownership state for the page is CPU-owned.

The CPU fault handler 211 changes the ownership state associated with the memory page to CPU-owned. The CPU fault handler 211 writes a command into the command queue 214 to cause the copy engine 212 to remove the entry from the PPU page table 208 that associates the virtual memory address with the memory page. Various TLB entries may be invalidated. The CPU fault handler 211 also copies the memory page from the PPU memory 204 into the system memory 104, which may be done via the command queue 214 and the copy engine 212. The CPU fault handler 211 writes a page table entry into the CPU page table 206 that associates the virtual memory address with the memory page that is copied into the system memory 104. The CPU fault handler 211 also updates the PSD 210 to associate the virtual memory address with the newly copied memory page. At this point, the page fault sequence is complete. The ownership state for the memory page is CPU-owned, meaning that the memory page is accessible only to the CPU 102. Only the CPU page table 206 includes an entry that associates the virtual memory address with the memory page.

A fault by the CPU 102 may initiate a transition from PPU-owned to CPU-shared. Prior to such a transition, an operation executing in the CPU 102 attempts to access memory at a virtual memory address that is not mapped in the CPU page table 206, which causes a CPU-based page fault. The CPU fault handler 211 reads the PSD 210 entry corresponding to the virtual memory address and identifies the memory page associated with the virtual memory address. After reading the PSD 210, the CPU fault handler 211 determines that the current ownership state for the memory page associated with the virtual memory address is PPU-owned. Based on the current ownership state or the type of access, as well as other factors, such as usage characteristics for the page, the CPU fault handler 211 determines that a new ownership state for the memory page is CPU-shared.

The CPU fault handler 211 changes the ownership state associated with the memory page to CPU-shared. The CPU fault handler 211 writes a command into the command queue 214 to cause the copy engine 212 to remove the entry from the PPU page table 208 that associates the virtual memory address with the memory page. Various TLB entries may be invalidated. The CPU fault handler 211 also copies the memory page from the PPU memory 204 into the system memory 104. This copy operation may be done via the command queue 214 and the copy engine 212. The CPU fault handler 211 then writes a command into the command queue 214 to cause the copy engine 212 to change the entry in PPU page table 208 such that the virtual memory address is associated with the memory page in the system memory 104. Various TLB entries may be invalidated. The CPU fault handler 211 writes a page table entry into the CPU page table 206 to associate the virtual memory address with the memory page in the system memory 104. The CPU fault handler 211 also updates the PSD 210 to associate the virtual memory address with the memory page in system memory 104. At this point, the page fault sequence is complete. The ownership state for the page is CPU-shared, and the memory page has been copied into the system memory 104. The page is accessible to the CPU 102, since the CPU page table 206 includes an entry that associates the virtual memory address with the memory page in the system memory 104. The page is also accessible to the PPU 202, since the PPU page table 208 includes an entry that associates the virtual memory address with the memory page in the system memory 104.

Detailed Example of a Page Fault Sequence

With this context, a detailed description of a page fault sequence executed by the PPU fault handler 215 in the event of a transition from CPU-owned to CPU-shared is now provided to show how atomic operations and transition states may be used to more effectively manage a page fault sequence. The page fault sequence is triggered by a PPU 202 thread attempting to access a virtual address for which a mapping does not exist in the PPU page table 208. When a thread attempts to access data via a virtual memory address, the PPU 202 (specifically, a user-level thread) requests a translation from the PPU page table 208. A PPU page fault occurs in response because the PPU page table 208 does not include a mapping associated with the requested virtual memory address.

After the page fault occurs, the thread enters a trap, stalls, and the PPU fault handler 215 executes a page fault sequence. The PPU fault handler 215 reads the PSD 210 to determine which memory page is associated with the virtual memory address and to determine the state for the virtual memory address. The PPU fault handler 215 determines, from the PSD 210, that the ownership state for that memory page is CPU-owned. Consequently, the data requested by the PPU 202 is inaccessible to the PPU 202 via a virtual memory address. State information for the memory page also indicates that the requested data cannot be migrated to the PPU memory 204.

Based on the state information obtained from the PSD 210, the PPU fault handler 215 determines that a new state for the memory page should be CPU-shared. The PPU fault handler 215 changes the state to "transitioning to CPU-shared." This state indicates that the page is currently in the process of being transitioned to CPU-shared. When the PPU fault handler 215 runs on a microcontroller in the memory management unit, then two processors will update the PSD 210 asynchronously, using atomic compare-and-swap ("CAS") operations on the PSD 210 to change the state to "transitioning to GPU visible," (CPU-shared).

The PPU 202 updates the PPU page table 208 to associate the virtual address with the memory page. The PPU 202 also invalidates the TLB cache entries. Next, the PPU 202 performs another atomic compare-and-swap operation on the PSD 210 to change the ownership state associated with the memory page to CPU-shared. Finally, the page fault sequence ends, and the thread that requested the data via the virtual memory address resumes execution.

UVM System Architecture Variations

Various modifications to the unified virtual memory system 200 are possible. For example, in some embodiments, after writing a fault buffer entry into the fault buffer 216, the PPU 202 may trigger a CPU interrupt to cause the CPU 102 to read fault buffer entries in the fault buffer 216 and perform whatever operations are appropriate in response to the fault buffer entry. In other embodiments, the CPU 102 may periodically poll the fault buffer 216. In the event that the CPU 102 finds a fault buffer entry in the fault buffer 216, the CPU 102 executes a series of operations in response to the fault buffer entry.

In some embodiments, the system memory 104, rather than the PPU memory 204, stores the PPU page table 208. In other embodiments, a single or multiple-level cache hierarchy, such as a single or multiple-level translation look-aside buffer (TLB) hierarchy (not shown), may be implemented to cache virtual address translations for either the CPU page table 206 or the PPU page table 208.

In yet other embodiments, in the event that a thread executing in the PPU 202 causes a PPU fault (a "faulting thread"), the PPU 202 may take one or more actions. These actions include: stall the entire PPU 202, stall the SM executing the faulting thread, stall the PPU MMU 213, stall only the faulting thread, or stall one or more levels of TLBs. In some embodiments, after a PPU page fault occurs, and a page fault sequence has been executed by the unified virtual memory system 200, execution of the faulting thread resumes, and the faulting thread attempts, again, to execute the memory access request that caused the page fault. In some embodiments, stalling at a TLB is done in such a way as to appear as a long-latency memory access to the faulting SM or faulting thread, thereby not requiring the SM to do any special operation for a fault.

Finally, in other alternative embodiments, the UVM driver 101 may include instructions that cause the CPU 102 to execute one or more operations for managing the UVM system 200 and remedying a page fault, such as accessing the CPU page table 206, the PSD 210, and/or the fault buffer 216. In other embodiments, an operating system kernel (not shown) may be configured to manage the UVM system 200 and remedy a page fault by accessing the CPU page table 206, the PSD 210, and/or the fault buffer 216. In yet other embodiments, an operating system kernel may operate in conjunction with the UVM driver 101 to manage the UVM system 200 and remedy a page fault by accessing the CPU page table 206, the PSD 210, and/or the fault buffer 216.

Migration of Peer-Mapped Memory Pages

Figure 3:
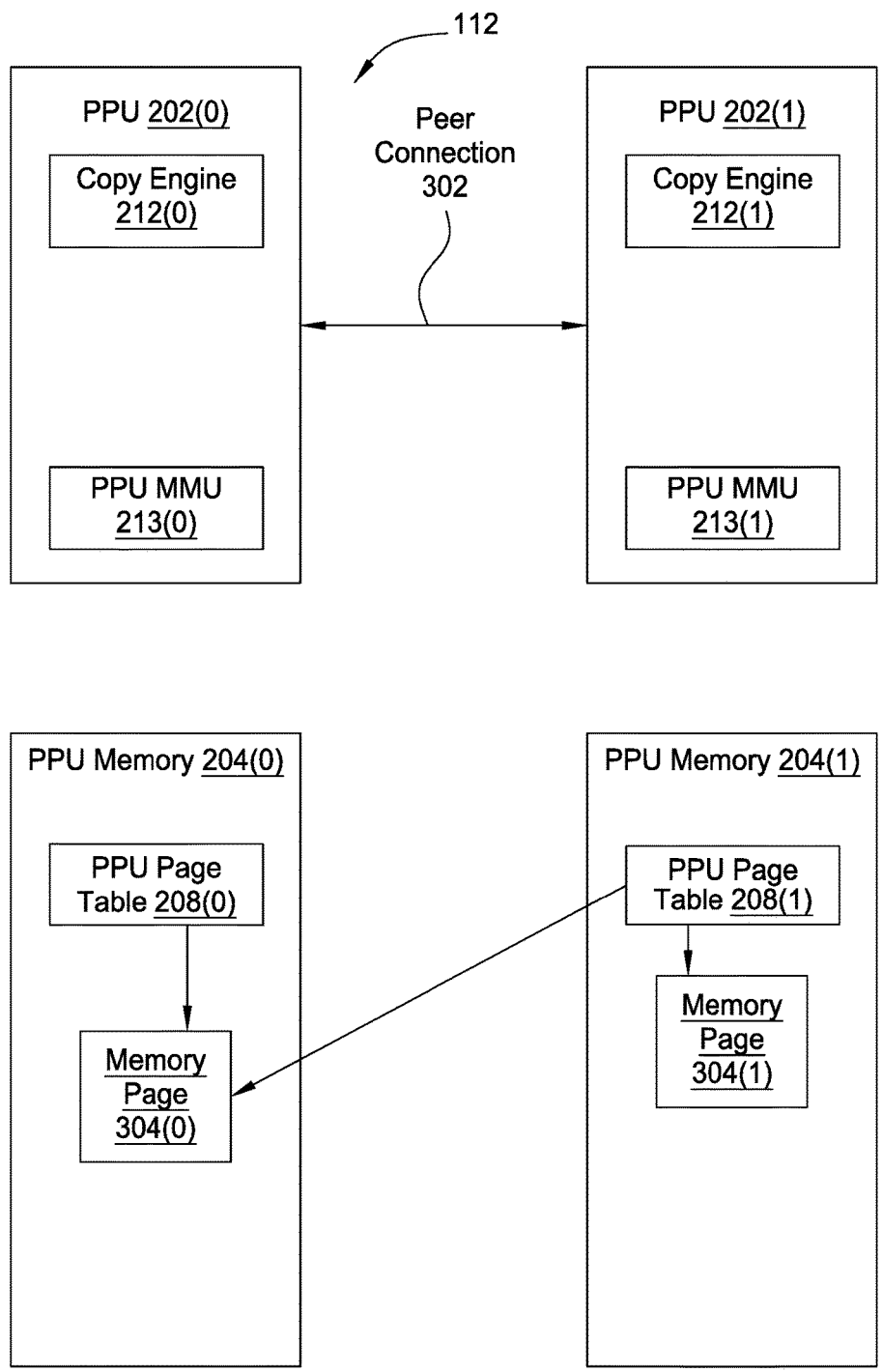
FIG. 3 illustrates the parallel processing subsystem of FIG. 1, according to one embodiment of the present invention.

FIG. 3 illustrates the parallel processing subsystem 112 of FIG. 1, according to one embodiment of the present invention. As shown, parallel processing subsystem 112 includes two parallel processing units (PPUs), PPU 202(0) and PPU 202(1) connected to each other through peer connection 302 and two parallel processing unit memories (PPU memories), PPU memory 204(0) and PPU memory 204(1), where each PPU memory 204 is connected to a corresponding PPU 202. In various embodiments, the parallel processing subsystem 112 of FIG. 1 may include more than two PPUs 202.

To communicate with CPU 102, each PPU 202 is connected to memory bridge 105 (shown in FIG. 2). Further, each PPU 202 has a PPU memory 204 for local storage. More specifically, PPU 202(0) is connected to PPU memory 204(0) and PPU 202(1) is connected to PPU memory 204(1).

PPUs 202 and PPU memories 204 operate in substantially the same manner as described above with respect to FIGS. 1 and 2, but also implement a peer-to-peer communication through peer connection 302. Such peer-to-peer communication allows one PPU 202 to access memory pages in a PPU memory 204 coupled to the other PPU 202. For example, PPU 202(0) may, through peer connection 302, read a memory page stored in PPU memory 204(1). Peer connection 302 may be implemented with any protocol, and could, for example, use a PCIe (peripheral component interconnect express) bus.

As with memory pages accessed, shared, and migrated back and forth between CPU 102 and PPU 202 and their respective memories, discussed above in conjunction with FIG. 2, the same relationships exist across different PPUs 202. For example, PPU memory 204(0) stores PPU page table 208(0) that is associated with PPU 202(0), and PPU memory 204(1) stores PPU page table 208(1) that is associated with PPU 202(1). Each PPU page table 208 stores page table entries that associate virtual memory addresses with memory pages. Because peer connection 302 allows either PPU 202(0) or PPU 202(1), as the case may be, to access a memory page stored in the PPU memory 204 connected to the other PPU 202, a given page table entry in either PPU page table 208(0) or PPU page table 208(1) may associate a virtual memory address with a memory page stored in either PPU memory 204(0) or 204(1). For example, PPU page table 208(0) may include a page table entry that associates a virtual memory address with a memory page stored in PPU memory 204(1) connected to PPU 202(1). Similarly, PPU page table 208(1) may include a page table entry that associates a virtual memory address with a memory page stored in PPU memory 204(0) connected to PPU 202(0).

Although FIG. 3 illustrates only two PPUs 202, persons skilled in the art will appreciate that in systems having more than two PPUs 202, each PPU would have an associated PPU memory 204 that would store a PPU page table 208 associated with the particular PPU 202. Through appropriate page table entries in the PPU page table 208 associated with a particular PPU 202, that PPU 202 could access memory pages stored in a PPU memory 204 connected to that PPU 202 or could access memory pages stored in a PPU memory 204 connected to a different PPU 202.

In that regard, as used herein, a memory page that is stored in one PPU memory 204, such as PPU memory 204(0), but for which a page table entry exists in the page table 2087 of another PPU 202 such as PPU page table 208(1), is considered to be a "peer-mapped memory page." Such memory pages are shared by the different PPUs 202 in parallel processing subsystem 112. For example, if PPU page table 208(0) and PPU page table 208(1) were to have entries associated with the same memory page, then both PPU 202(0) and PPU 202(1) would be able to access that memory page. A memory page that is stored in one PPU memory 204, such as PPU memory 204(0), but for which a page table entry exists only in the page table 208 residing in that same PPU memory 204, such as PPU page table 208(0) residing in PPU memory 204(0), is considered to be a "local memory page." Such a memory page is not shared among different PPUs 202. Rather, the memory page is considered to be "owned" by the PPU 202 associated with the PPU page table 208 having the entry corresponding to that particular memory page.

As described above in conjunction with FIG. 2, PSD 210 functions as a "master page table" and, therefore, includes entries associated with the different memory pages stored in PPU memories 204. Further, such entries indicate which PPU memory 204 stores a given memory page as well as which PPU page table(s) 208 include page table entries associated with that given memory page. For example, an entry in PSD 210 that is associated with a given memory page may indicate that the memory page is stored in PPU memory 204(0), where each of PPU page tables 208(0) and 208(1) includes at least one page table entry associated with the memory page. Additionally, entries in PSD 210 indicate an ownership state for a given memory page. Any given page may have an ownership state of CPU-owned, PPU-owned, or CPU-shared, as discussed with respect to FIG. 2. A given memory page may also have an ownership state of "PPU-shared," which, again, indicates that the memory page is a peer-mapped memory page and that multiple PPU page tables 208 include page table entries associated with the memory page. Thus, in the above example where the memory page is stored in PPU memory 204(0), where each of PPU page tables 208(0) and 208(1) includes at least one page table entry associated with the memory page, that particular memory page would be a "PPU-shared" memory page and would shared by PPU 202(0) and PPU 202(1). The memory page also would be considered to be a peer-mapped memory page.

For discussion purposes only, FIG. 3 includes two example memory pages 304(0) and 304(1) to illustrate some of the different ownership states previously described herein. As shown, memory page 304(0) is stored in PPU memory 204(0) and is mapped by both PPU page table 208(0) and PPU page table 208(1). Because memory page 304(0) is mapped by both PPU page tables 208(0) and 208(1), memory page 304(0) has an ownership state of PPU-shared, meaning that both PPU 202(0) and PPU 202(1) are able to access memory page 304(0). By contrast, memory page 304(1) is stored in PPU memory 204(1) and is mapped only by PPU page table 208(1), meaning that only PPU 202(1) is able to access memory page 304(1). Because memory page 304(1) is stored in PPU memory 204(1) and can be accessed only by PPU 202(1), memory page 304(1) has an ownership state of PPU-owned.

During operation, UVM system 200 (e.g., via UVM driver 101 or an operating system kernel) may determine that a given memory page stored in one of PPU memory 204(0) or PPU memory 204(1) should be transmitted to the other PPU memory, and/or that an ownership state for the given memory page should be changed. Such a determination may be made when a memory access by a particular PPU 202 triggers a page fault. This determination may also be made when a particular heuristic indicates that a memory page should be migrated and/or an ownership state of the memory page should be changed. These heuristics may include, for example, the heuristics discussed above with respect to FIG. 2. The determination described above may also be made when an application program requests that a memory page should be migrated and/or an ownership state of the memory page should be changed. When this determination is made, UVM system 200 executes a peer transition sequence, which includes steps for changing the ownership state of a memory page and/or transmitting a memory page from one PPU memory 204 to a different PPU memory 204.

The specific steps of any peer transition sequence are based on, among other things, which PPU memory 204 currently stores the memory page, which PPU page tables 208 include page table entries associated with the memory page, usage history of the memory page, and which PPU memory 204 should ultimately store the memory page.

Six example peer transition sequences are described in the context of the virtual memory subsystem 112 shown and described with reference to in FIG. 3, which includes a first PPU 202(0) connected to a first PPU memory 204(0) and associated with a first PPU page table 208(0), and a second PPU 202(1) connected to a second PPU memory 204(1) and associated with a second PPU page table 208(1). These six peer transition sequences include three peer transition sequences for which the starting condition is that the memory page is a "PPU-owned" memory page and three peer transition sequences for which the starting condition is that the memory page is a "PPU-shared" memory page.

From a starting condition in which the memory page is "PPU-owned," and thus is stored in the first PPU memory 204(0) and mapped in the first PPU page table 208(0), the state of the memory page may transition to one of the following: (a) being stored in the second PPU memory 204(1) and mapped only in the second PPU page table 208(1); (b) continuing to be stored in the first PPU memory 204(0) and being mapped in both the first PPU page table 208(0) and the second PPU page table 208(1); and (c) being stored in the second PPU memory 204(1) and being mapped in both the first PPU page table 208(0) and the second PPU page table 208(1).

From a starting condition in which the memory page is "PPU-shared," and is thus stored in the first PPU memory 204(0) and mapped in both the first PPU page table 208(0) and the second PPU page table 208(1), the state of the memory page may transition to one of the following: (a) being stored in the second PPU memory 204(1) and mapped in both the first PPU page table 208(0) and the second PPU page table 208(1); (b) continuing to be stored in the first PPU memory 204(0) and being mapped only in the first PPU page table 208(0); and (c) being stored in the second PPU memory 204(1) and only mapped in the second PPU page table 208(1). Additional technical details regarding these six peer sequence transitions, as well as other technical details regarding the operations of a unified virtual memory system 200 that includes multiple PPUs 202 are provided in greater detail below with respect to FIGS. 4A-4F.

Figure 4A:
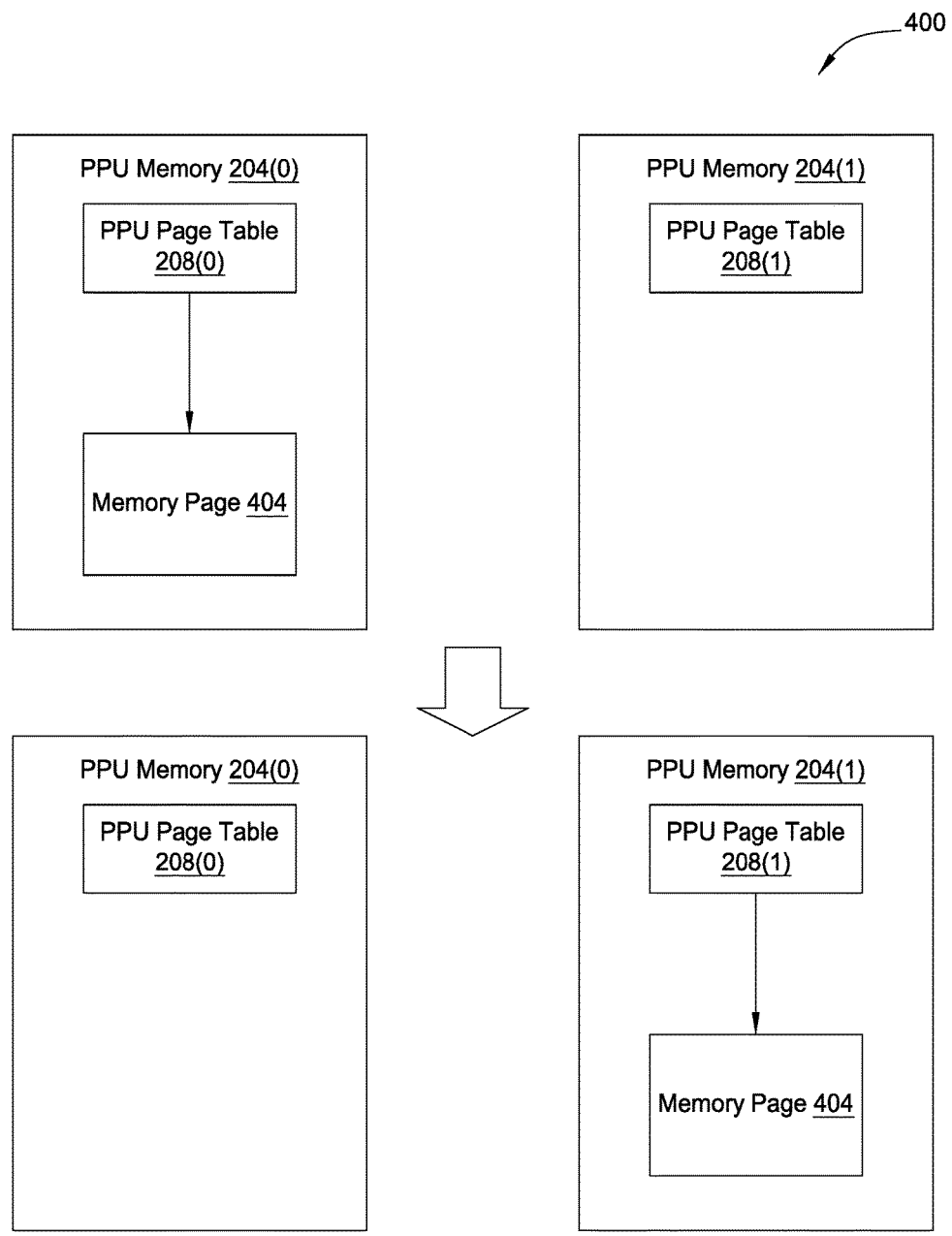
FIGS. 4A-4F illustrate different peer transition sequences, according to various embodiments of the present invention.

FIG. 4A illustrates a peer transition sequence 400, according to one embodiment of the present invention. Initially, PPU memory 204(0), which is associated with PPU 202(0) stores memory page 404. PPU memory 204(0) also stores PPU page table 208(0), which is associated with PPU 202(0) and includes a mapping associated with memory page 404. PPU memory 204(1), which is associated with PPU 202(1) does not store the memory page 404, and PPU page table 208(1), which is associated with PPU 202(1), does not include a mapping associated with memory page 404. PSD 210 stores a PSD entry corresponding to the memory page 404 that indicates an ownership state that the memory page 404 is PPU-owned.

According to the peer transition sequence 400, the PPU 202(0) removes the mapping associated with memory page 404 from PPU page table 208(0). A PPU 202 then copies the memory page 404 from PPU memory 204(0) to PPU memory 204(1). Additionally, the PPU 202 writes a mapping associated with memory page 404 to PPU page table 208(1). Either of the PPU 202(0) or the PPU 202(1) may execute the copy of memory page 404 described above. Other units capable of copying memory pages between PPU memory 204(0) and PPU memory 204(1) as well as altering PPU page tables 208(0) and PPU page table 208(1) may perform the steps as well. The UVM driver 101 also updates the PSD entry corresponding to the memory page 404 when the peer transition sequence is executed to indicate that the memory page 404 is PPU-owned.

Figure 4B:
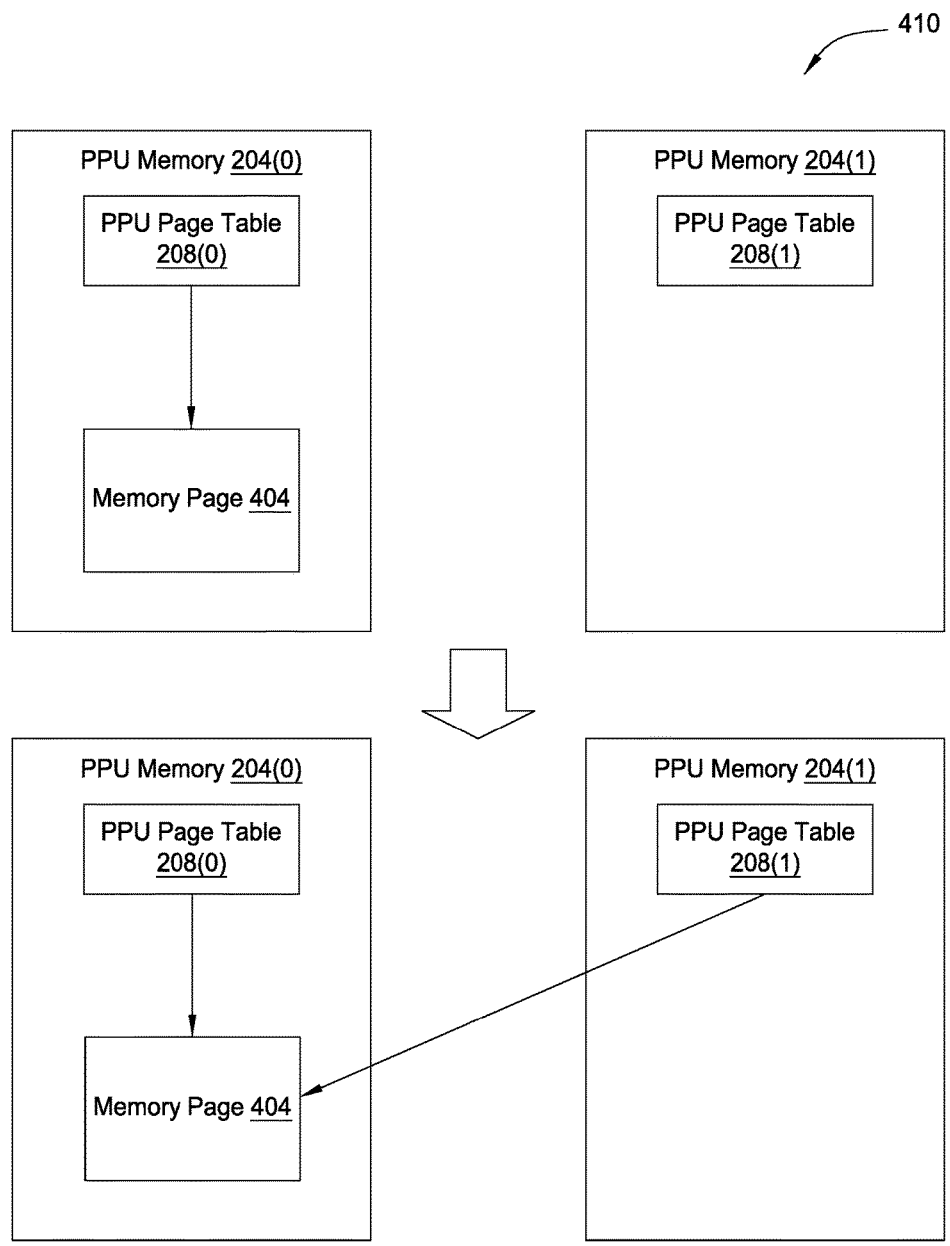

FIG. 4B illustrates a peer transition sequence 410, according to another embodiment of the present invention. As with FIG. 4A, initially, PPU memory 204(0), which is associated with PPU 202(0) stores memory page 404. PPU memory 204(0) also stores PPU page table 208(0), which is associated with PPU 202(0) and includes a mapping associated with memory page 404. PPU memory 204(1), which is associated with PPU 202(1) does not store the memory page 404, and PPU page table 208(1), which is associated with PPU 202(1), does not include a mapping associated with memory page 404. PSD 210 stores a PSD entry corresponding to the memory page 404 that indicates an ownership state that the memory page 404 is PPU-owned. According to the peer transition sequence 410, the PPU 202(1) or another unit capable of modifying PPU page table 208(1) updates PPU page table 208(1) to include a mapping associated with memory page 404. Subsequently, both PPU page table 208(0) and PPU page table 208(1) include mappings to memory page 404, and memory page 404 has the ownership state of PPU-shared. The UVM driver 101 updates the PSD entry corresponding to the memory page 404 when the peer transition sequence is executed to indicate that the memory page 404 is PPU-shared.

Figure 4C:
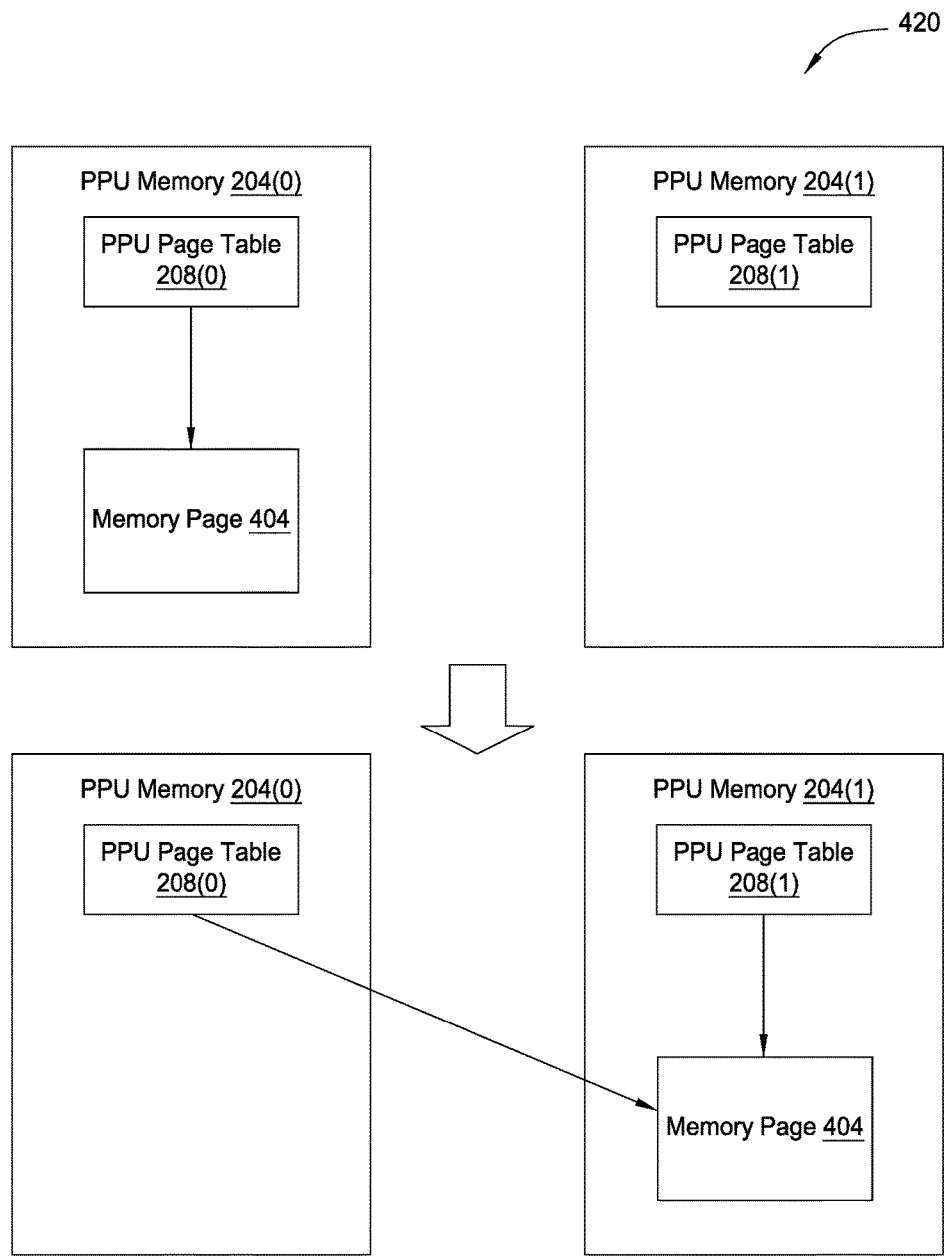

FIG. 4C illustrates a peer transition sequence 420, according to a another embodiment of the present invention. As with FIGS. 4A and 4B, initially, PPU memory 204(0), which is associated with PPU 202(0) stores memory page 404. PPU memory 204(0) also stores PPU page table 208(0), which is associated with PPU 202(0) and includes a mapping associated with memory page 404. PPU memory 204(1), which is associated with PPU 202(1) does not store the memory page 404, and PPU page table 208(1), which is associated with PPU 202(1), does not include a mapping associated with memory page 404. PSD 210 stores a PSD entry corresponding to the memory page 404 that indicates an ownership state that the memory page 404 is PPU-owned.

According to the peer transition sequence 420, the PPU 202(0) removes the mapping associated with memory page 404 from PPU page table 208(0). A PPU 202 copies the memory page 404 from PPU memory 204(0) to PPU memory 204(1). The PPU 202(0) also updates the mapping associated with memory page 404 in PPU page table 208(0) to point to the memory page 404 stored in PPU memory 204(1). Additionally, the PPU 202(1) writes a mapping associated with memory page 404 to PPU page table 208(1). Either of the PPU 202(0) or the PPU 202(1) may execute the copy of the memory page 404 described above. Other units capable of copying memory pages between PPU memory 204(0) and PPU memory 204(1) as well as altering PPU page tables 208(0) and PPU page table 208(1) may perform the steps as well. The UVM driver 101 also updates the PSD entry corresponding to the memory page 404 when the peer transition sequence is executed to indicate that the memory page 404 is PPU-shared.

Figure 4D:
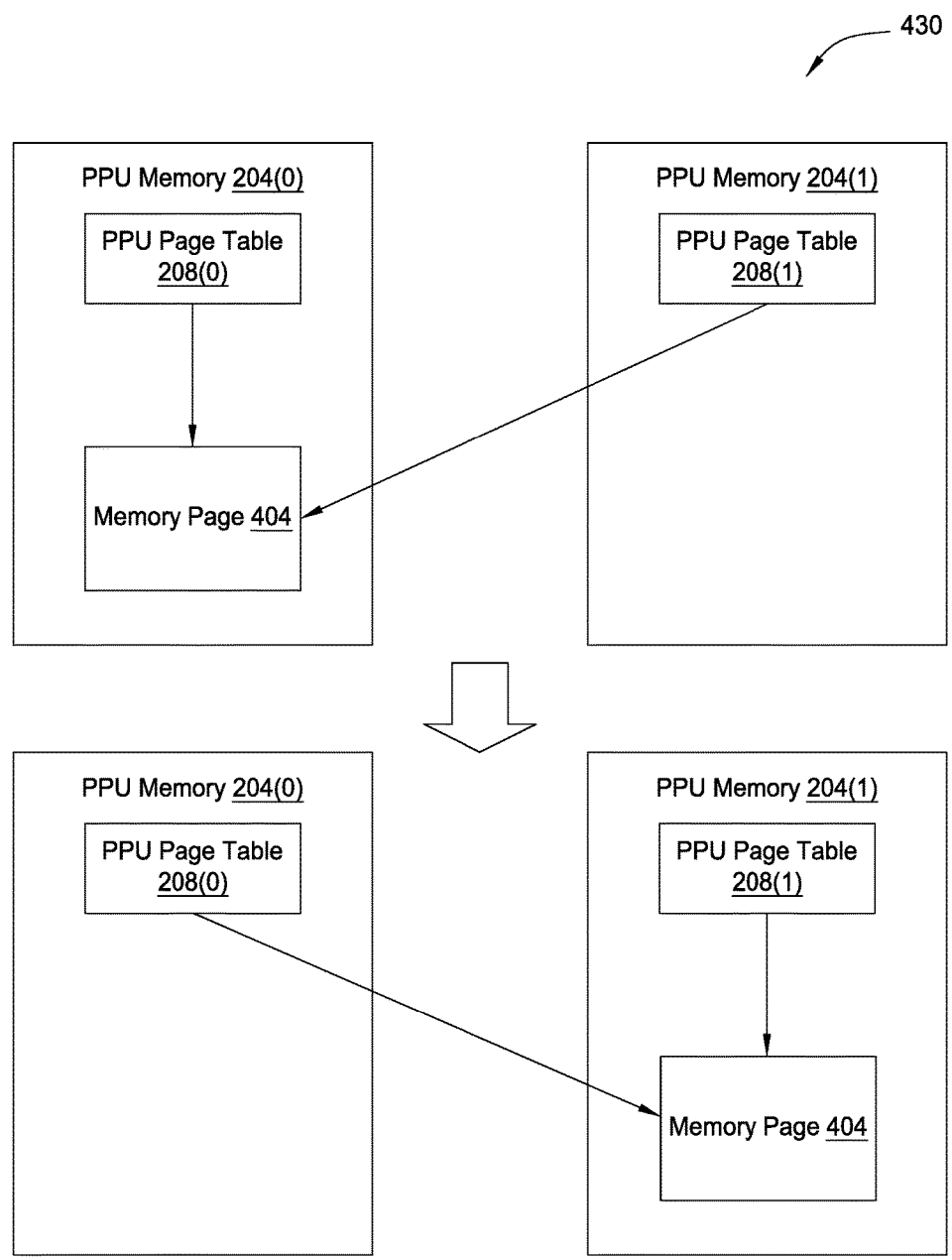

FIG. 4D illustrates another peer transition sequence 430, according to another embodiment of the present invention. Initially, PPU memory 204(0), which is associated with PPU 202(0) stores memory page 404. PPU memory 204(0) also stores PPU page table 208(0), which is associated with PPU 202(0) and includes a mapping associated with memory page 404. PPU memory 204(1), which is associated with PPU 202(1) stores PPU page table 208(1), which includes a mapping associated with memory page 404. PPU memory 204(1) does not store the memory page 404, but the mapping stored in PPU page table 208(1) is associated with the memory page 404 stored in PPU memory 204(0). PSD 210 stores a PSD entry corresponding to the memory page 404 that indicates an ownership state that the memory page 404 is PPU-shared.

According to the peer transition sequence 430, several operations are performed. Different operations in peer transition sequence 430 are performed in parallel by two different PPUs 202, as follows. PPU 202(1) removes the mapping stored in PPU page table 208(1) that is associated with memory page 404 and informs PPU 202(0) that this mapping removal operation is complete. Similarly, PPU 202(0) removes the mapping stored in PPU page table 208(0) that is associated with memory page 404 and informs PPU 202(1) that this mapping removal operation is complete. The mapping removal operations executed by both PPU 202(0) and PPU 202(1) may be performed in parallel. In other words, these operations may be performed such that the operations at least partially overlap in time.

When PPU 202(0) completes the mapping removal operation and is informed that the mapping removal operation for PPU 202(0) is complete, either PPU 202(0) or PPU 202(1) copies memory page 404 from PPU memory 204(0) to PPU memory 204(1), while the other PPU 202 waits for this copy operation to complete. When this copy operation is complete, PPU 202(0) stores a mapping to memory page 404 in PPU page table 208(0). After this new mapping operation, PPU 202(0) informs UVM driver 101 that the operations executed by PPU 202(0) that are associated with the peer transition sequence 430 are complete. Similarly, when the copy operation is complete, PPU 202(1) stores a mapping to memory page 404 in PPU page table 208(1). After this new mapping operation, PPU 202(1) informs UVM driver 101 that the operations executed by PPU 202(1) that are associated with the peer transition sequence 430 are complete.

Figure 4E:
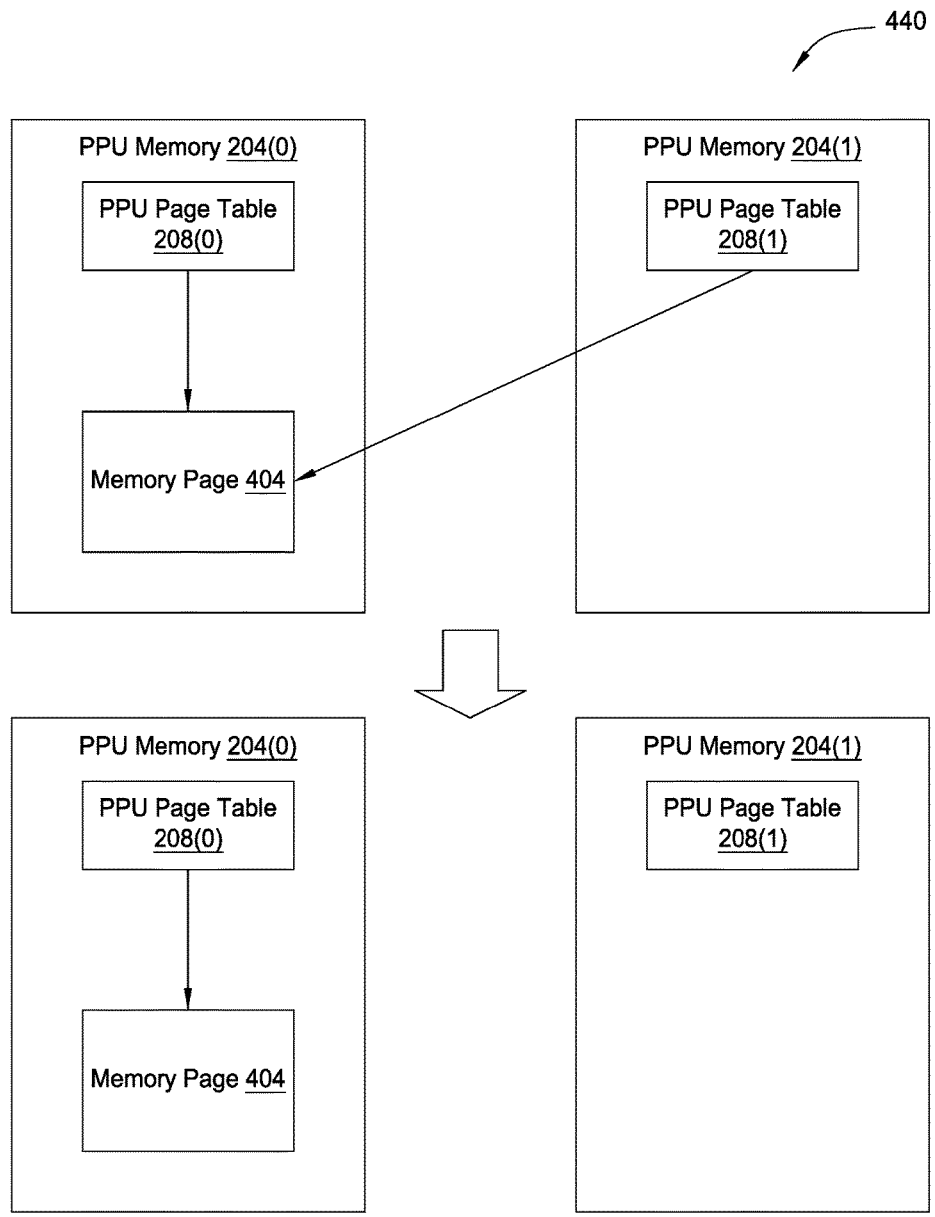

FIG. 4E illustrates a peer transition sequence 440, according to an additional embodiment of the present invention. As with FIG. 4D, initially, PPU memory 204(0), which is associated with PPU 202(0) stores memory page 404. PPU memory 204(0) also stores PPU page table 208(0), which is associated with PPU 202(0) and includes a mapping associated with memory page 404. PPU memory 204(1), which is associated with PPU 202(1) stores PPU page table 208(1), which includes a mapping associated with memory page 404. PPU memory 204(1) does not store the memory page 404, but the mapping stored in PPU page table 208(1) is associated with the memory page 404 stored in PPU memory 204(0). PSD 210 stores a PSD entry corresponding to the memory page 404 that indicates an ownership state that the memory page 404 is PPU-shared. According to the peer transition sequence 440, PPU 202(1) simply removes the mapping stored in PPU page table 208(1) that is associated with memory page 404. The UVM driver 101 also updates the PSD entry corresponding to the memory page 404 when the peer transition sequence is executed to indicate that the memory page 404 is PPU-owned. Memory page 404 is only visible to PPU 202(0) and is stored in PPU memory 204(0).

Figure 4F:
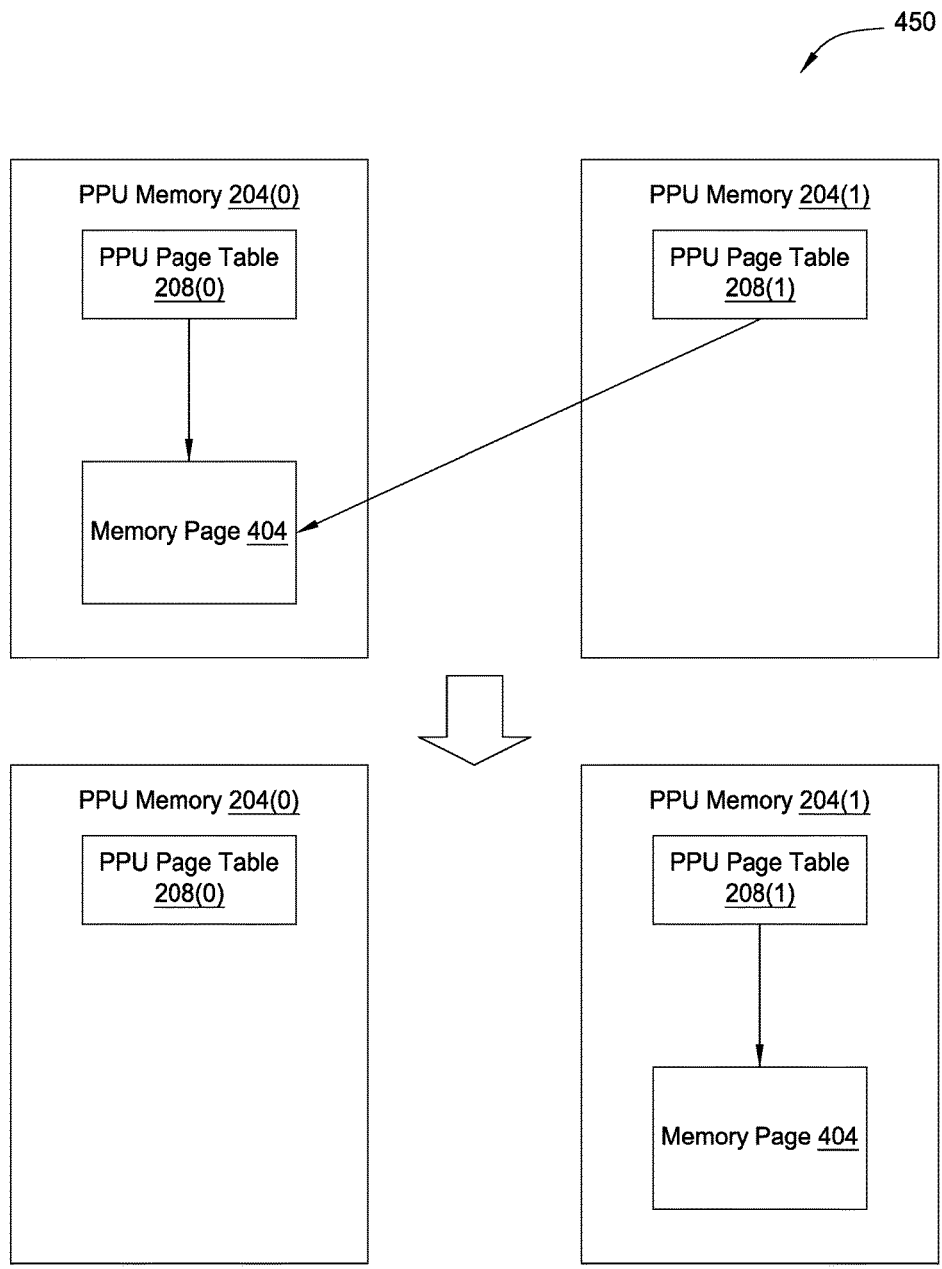

FIG. 4F illustrates a peer transition sequence 450, according to yet another embodiment of the present invention. As with FIGS. 4D and 4E, initially, PPU memory 204(0), which is associated with PPU 202(0) stores memory page 404. PPU memory 204(0) also stores PPU page table 208(0), which is associated with PPU 202(0) and includes a mapping associated with memory page 404. PPU memory 204(1), which is associated with PPU 202(1) stores PPU page table 208(1), which includes a mapping associated with memory page 404. PPU memory 204(1) does not store the memory page 404, but the mapping stored in PPU page table 208(1) is associated with the memory page 404 stored in PPU memory 204(0). The UVM driver 101 updates the PSD entry corresponding to the memory page 404 when the peer transition sequence is executed. PSD 210 stores a PSD entry corresponding to the memory page 404 that indicates an ownership state that the memory page 404 is PPU-shared.

According to the peer transition sequence 450, several operations are performed, some of which may be performed in parallel by two different PPUs 202. PPU 202(1) removes the mapping stored in PPU page table 208(1) that is associated with memory page 404 and informs PPU 202(0) that this mapping removal operation is complete. Similarly, PPU 202(0) removes the mapping stored in PPU page table 208(0) that is associated with memory page 404 and informs PPU 202(1) that this mapping removal operation is complete. The mapping removal operations executed by both PPU 202(0) and PPU 202(1) may be performed in parallel. In other words, these operations may be performed such that the operations at least partially overlap in time.

When PPU 202(0) completes the mapping removal operation and is informed that the mapping removal operation for PPU 202(0) is complete, either PPU 202(0) or PPU 202(1) copies memory page 404 from PPU memory 204(0) to PPU memory 204(1), while the other PPU 202 waits for this copy operation to complete. When this copy operation is complete, PPU 202(1) stores a mapping to memory page 404 in PPU page table 208(1). After this new mapping operation, PPU 202(1) informs UVM driver 101 that the operations executed by PPU 202(1) that are associated with the peer transition sequence 450 are complete. The UVM driver 101 updates the PSD entry corresponding to the memory page 404 when the peer transition sequence is executed to indicate that the memory page 404 is PPU-owned.

Persons skilled in the art will recognize that the six peer transition sequences described above are also applicable across any PPUs in an implementation of a unified virtual memory subsystem 112 that includes more than two PPUs 202.

Figure 5:
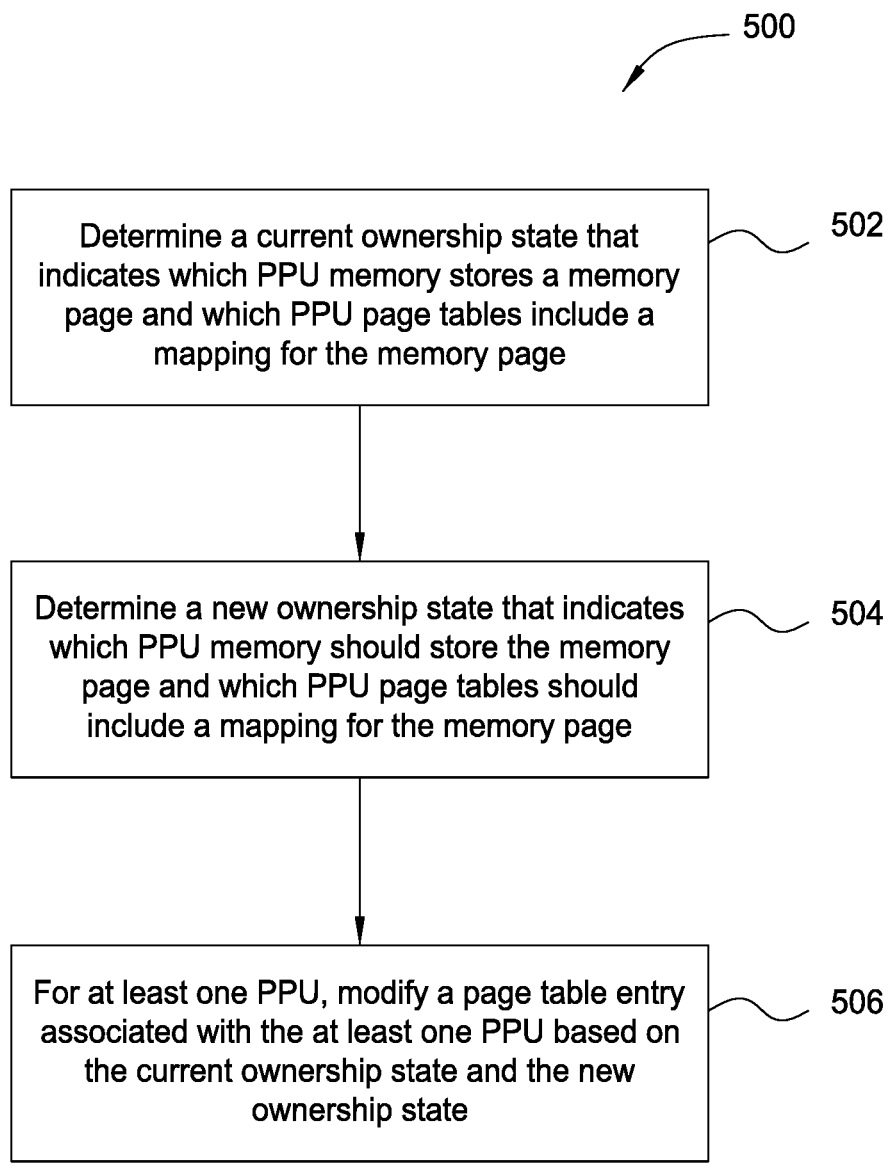
FIG. 5 is a flow diagram of method steps for performing a peer transition sequence, according to one embodiment of the present invention.

FIG. 5 is a flow diagram of method steps for performing a peer transition sequence, according to one embodiment of the present invention. Although the method steps are described in conjunction with FIGS. 1-4F, persons skilled in the art will understand that any system configured to perform the method steps, in any order, falls within the scope of the present invention.

As shown, a method 500 begins in step 502, in which the UVM driver 101 determines a current ownership state that indicates which PPU memory 204 stores a memory page and which PPU page tables 208 include a mapping for the memory page. The current ownership state may indicate, for example, that PPU memory 204(0) stores a particular memory page and that both PPU page table 208(0) and PPU page table 208(1) include mappings for the memory page, and may be stored in PSD 210. In step 504, the UVM driver 101 determines a new ownership state that indicates which PPU memory 204 should store the memory page and which PPU page tables should include a mapping for the memory page. As with the current ownership state, the new ownership state may indicate, for example, that PPU memory 204(1) should store the memory page and that only PPU page table 208(1) should include a mapping for that memory page. In step 506, UVM driver 101 modifies a page table entry associated with at least one PPU 202 to indicate the new ownership state. This operation may also include migrating the memory page from one PPU memory 204 to another PPU memory 204.

The method steps described above describe operations that are performed for the six different peer transition sequences described with respect to FIGS. 4A-4F. Persons skilled in the art will recognize that these method steps may be applicable to other peer transition sequences as well.

In sum, techniques are provided by which memory pages may be migrated between PPU memories in a multi-PPU system. According to the techniques, a UVM driver determines that a particular memory page should change ownership state and/or be migrated between one PPU memory and another PPU memory. In response to this determination, the UVM driver initiates a peer transition sequence to cause the ownership state and/or location of the memory page to change. Various peer transition sequences involve modifying mappings for one or more PPU, and copying a memory page from one PPU memory to another PPU memory. Several steps in peer transition sequences may be performed in parallel for increased processing speed.

One advantage of the disclosed approach is that techniques are provided that allow memory pages to be migrated among PPU memories in a multi-PPU system. Migrating memory pages among PPU memories improves access speed by moving memory pages closer to PPUs that frequently access the memory pages. Another advantage is that the techniques for migrating memory pages among PPU memories in the multi-PPU system may be performed in parallel, which increases the speed with which these techniques can be performed.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method, comprising:
   determining a new ownership state for a memory page, wherein the new ownership state indicates a parallel processor (PPU) having an associated PPU memory in which the memory page should be stored, and the new ownership state further indicates any other PPUs that should include a page table entry corresponding to the memory page in an associated page table; and
   modifying a page table entry in a page table associated with at least one PPU based on a current ownership state and the new ownership state.

2. The method of claim 1, wherein the current ownership state indicates that the memory page is stored in a first PPU memory associated with a first PPU, that a first PPU page table associated with the first PPU includes a page table entry corresponding to the memory page, and that a second PPU page table associated with a second PPU does not include a page table entry associated with the memory page.

3. The method of claim 2, wherein the new ownership state indicates that the memory page should be transmitted to a second PPU memory associated with the second PPU and that only the second PPU page table should include a page table entry corresponding to the memory page, and further comprising:
   removing a page table entry corresponding to the memory page from the first PPU page table;
   transmitting the memory page from the first PPU memory to the second PPU memory; and
   creating a page table entry in the second PPU page table corresponding to the memory page.

4. The method of claim 2, wherein the new ownership state indicates that the memory page should be transmitted to the second PPU memory and that the first PPU page table and the second PPU page table should both include page table entries corresponding to the memory page, and further comprising:
   removing a page table entry corresponding to the memory page from the first PPU page table;
   transmitting the memory page from the first PPU memory to the second PPU memory;
   creating a page table entry in the first PPU page table corresponding to the memory page; and
   creating a page table entry in the second PPU page table corresponding to the memory page.

5. The method of claim 2, wherein the new ownership state indicates that the memory page should not be transmitted to a second PPU memory corresponding to the second PPU and that the first PPU page table and the second PPU page table should include page table entries corresponding to the memory page, and further comprising creating a page table entry in the second PPU page table corresponding to the memory page.

6. The method of claim 1, wherein the current ownership state indicates that the memory page is stored in a first PPU memory corresponding to a first PPU, that a first PPU page table corresponding to the first PPU includes a page table entry corresponding to the memory page, and that a second PPU page table corresponding to a second PPU includes a page table entry corresponding to the memory page.

7. The method of claim 6, wherein the new ownership state indicates that the memory page should not to be transmitted to a second PPU memory corresponding to the second PPU and that a page table entry in the second PPU page table and corresponding to the memory page should be deleted, and further comprising removing the page table entry in the second PPU page table corresponding to the memory page.

8. The method of claim 6, wherein the new ownership state indicates that the memory page should be transmitted to a second PPU memory corresponding to the second PPU, that a page table entry should be deleted from the first PPU page table, and that the second PPU page table should include an entry corresponding to the memory page, and further comprising:
removing a page table entry corresponding to the memory page from the first PPU page table;
removing a page table entry corresponding to the memory page from the second PPU page table;
transmitting the memory page from the first PPU memory to the second PPU memory; and
creating a page table entry in the second PPU page table that is corresponding to the memory page.

9. The method of claim 6, wherein the new ownership state indicates that the memory page should be transmitted to a second PPU memory corresponding to the second PPU, that a page table entry corresponding to the memory page should be written to the first PPU page table, and that a page table entry corresponding to the memory page should be written to the second PPU page table, and further comprising:
removing a page table entry corresponding to the memory page from the first PPU page table;
removing a page table entry corresponding to the memory page from the second PPU page table;
transmitting the memory page from the first PPU memory to the second PPU memory;
creating a page table entry in the first PPU page table corresponding to the memory page; and
creating a page table entry in the second PPU page table that is corresponding to the memory page.

10. The method of claim 1, wherein the virtual memory system includes two PPUs.

11. The method of claim 1, wherein the virtual memory system includes more than two PPUs.

12. The method of claim 1, further comprising determining the current ownership state for the memory page, wherein the current ownership state indicates a PPU having an associated PPU memory in which the memory page is currently stored, and the current ownership state further indicates any other PPUs having an associated page table that includes a page table entry with a mapping to the memory page.

13. The method of claim 1, wherein the PPU and the any other PPUs are included in a virtual memory subsystem.

14. A system, comprising:
at least two parallel processors (PPUs); and
a memory storing a unified virtual memory driver that, when executed by a processor, causes the processor to:
determine a new ownership state for a memory page, wherein the new ownership state indicates a parallel processor (PPU) having an associated PPU memory in which the memory page should be stored, and the new ownership state further indicates any other PPUs that should include a page table entry corresponding to the memory page in an associated page table; and
modify a page table entry in a page table associated with at least one PPU based on a current ownership state and the new ownership state.

15. The system of claim 14, wherein the current ownership state indicates that the memory page is stored in a first PPU memory associated with a first PPU, that a first PPU page table associated with the first PPU includes a page table entry corresponding to the memory page, and that a second PPU page table associated with a second PPU does not include a page table entry associated with the memory page.

16. The system of claim 15, wherein the new ownership state indicates that the memory page should be transmitted to a second PPU memory associated with the second PPU and that only the second PPU page table should include a page table entry corresponding to the memory page, and wherein the processor is further caused to:
remove a page table entry corresponding to the memory page from the first PPU page table;
transmit the memory page from the first PPU memory to the second PPU memory; and
create a page table entry in the second PPU page table corresponding to the memory page.

17. The system of claim 15, wherein the new ownership state indicates that the memory page should be transmitted to the second PPU memory and that the first PPU page table and the second PPU page table should both include page table entries corresponding to the memory page, and wherein the processor is further caused to:
remove a page table entry corresponding to the memory page from the first PPU page table;
transmit the memory page from the first PPU memory to the second PPU memory;
create a page table entry in the first PPU page table corresponding to the memory page; and
create a page table entry in the second PPU page table corresponding to the memory page.

18. The system of claim 15, wherein the new ownership state indicates that the memory page should not be transmitted to a second PPU memory corresponding to the second PPU and that the first PPU page table and the second PPU page table should include page table entries corresponding to the memory page, and wherein the processor is further caused to create a page table entry in the second PPU page table that is corresponding to the memory page.

19. The system of claim 14, wherein the current ownership state indicates that the memory page is stored in a first PPU memory corresponding to a first PPU, that a first PPU page table corresponding to the first PPU includes a page table entry corresponding to the memory page, and that a second PPU page table corresponding to a second PPU includes a page table entry corresponding to the memory page.

20. The system of claim 19, wherein the new ownership state indicates that the memory page should not to be transmitted to a second PPU memory corresponding to the second PPU and that a page table entry in the second PPU page table and corresponding to the memory page should be deleted, and wherein the processor is further causes to remove the page table entry in the second PPU page table corresponding to the memory page.

21. The system of claim 19, wherein the new ownership state indicates that the memory page should be transmitted to a second PPU memory corresponding to the second PPU, that a page table entry should be deleted from the first PPU page table, and that the second PPU page table should include an entry corresponding to the memory page, and wherein the processor is further caused to:
remove a page table entry corresponding to the memory page from the first PPU page table;
remove a page table entry corresponding to the memory page from the second PPU page table;

transmit the memory page from the first PPU memory to the second PPU memory; and create a page table entry in the second PPU page table that is corresponding to the memory page.

22. The system of claim 19, wherein the new ownership state indicates that the memory page should be transmitted to a second PPU memory corresponding to the second PPU, that a page table entry corresponding to the memory page should be written to the first PPU page table, and that a page table entry corresponding to the memory page should be written to the second PPU page table, and wherein the processor is further caused to:

remove a page table entry corresponding to the memory page from the first PPU page table;

remove a page table entry corresponding to the memory page from the second PPU page table;

transmit the memory page from the first PPU memory to the second PPU memory;

create a page table entry in the first PPU page table that is corresponding to the memory page; and create a page table entry in the second PPU page table that is corresponding to the memory page.

23. The system of claim 14, wherein the processor is further caused to determine the current ownership state for the memory page, wherein the current ownership state indicates a PPU having an associated PPU memory in which the memory page is currently stored, and the current ownership state further indicates any other PPUs having an associated page table that includes a page table entry with a mapping to the memory page.

24. The system of claim 14, wherein the at least two PPUs are included within a virtual memory subsystem.

25. A computing device, comprising:

a memory that includes a unified virtual memory driver; and a virtual memory subsystem coupled to the system memory and including:

at least two parallel processors (PPUs), wherein, when the unified virtual memory driver is executed by a processor, the processor is configured to:

determine a new ownership state for a memory page, wherein the new ownership state indicates a parallel processor (PPU) having an associated PPU memory in which the memory page should be stored, and the new ownership state further indicates any other PPUs that should include a page table entry corresponding to the memory page in an associated page table; and modify a page table entry in a page table associated with at least one PPU based on a current ownership state and the new ownership state.

26. The computing device of claim 25, wherein the processor is further configured to determine the current ownership state for the memory page, wherein the current ownership state indicates a PPU having an associated PPU memory in which the memory page is currently stored, and the current ownership state further indicates any other PPUs having an associated page table that includes a page table entry with a mapping to the memory page.

* * * * *